(12) United States Patent
Flanagan

(10) Patent No.: US 11,554,320 B2
(45) Date of Patent: Jan. 17, 2023

(54) SYSTEM AND METHOD FOR AN INTERACTIVE CONTROLLER

(71) Applicant: Bogie Inc., Brooklyn, NY (US)

(72) Inventor: Barry Flanagan, Brooklyn, NY (US)

(73) Assignee: Bogie Inc., Brooklyn, NY (US)

( * ) Notice: Subject to any disclaimer, the term of this patent is extended or adjusted under 35 U.S.C. 154(b) by 0 days.

(21) Appl. No.: 17/477,837

(22) Filed: Sep. 17, 2021

(65) Prior Publication Data

US 2022/0080301 A1 Mar. 17, 2022

Related U.S. Application Data

(60) Provisional application No. 63/079,661, filed on Sep. 17, 2020.

(51) Int. Cl.
| | | |
|---|---|---|
| *A63F 13/24* | (2014.01) | |
| *A63F 13/21* | (2014.01) | |
| *G06T 19/00* | (2011.01) | |
| *G06V 10/22* | (2022.01) | |
| *G06V 30/224* | (2022.01) | |
| *G06V 30/10* | (2022.01) | |

(52) U.S. Cl.
CPC .............. *A63F 13/24* (2014.09); *A63F 13/21* (2014.09); *G06T 19/006* (2013.01); *G06V 10/22* (2022.01); *G06V 30/2247* (2022.01); *A63F 2300/8082* (2013.01); *G06T 2219/024* (2013.01); *G06V 30/10* (2022.01)

(58) Field of Classification Search
CPC .. A63F 13/24; A63F 13/21; A63F 2300/8082; G06T 19/006; G06T 2219/024; G06V 10/22; G06V 30/2247; G06V 30/10
See application file for complete search history.

(56) References Cited

U.S. PATENT DOCUMENTS

| 2,274,973 A | 3/1942 | Bryant | |
|---|---|---|---|
| 4,415,097 A * | 11/1983 | Meins | B65D 25/44 |
| | | | 222/530 |

(Continued)

FOREIGN PATENT DOCUMENTS

| JP | 5340709 B2 | 11/2013 |
|---|---|---|
| JP | 2014010838 A | 1/2014 |
| RU | 2621633 C2 | 6/2017 |

OTHER PUBLICATIONS

Sanzliot. Nintendo Switch Joy Con Drink Holder. Online. Jul. 28, 2017. Accessed via the Internet. Accessed Jan. 15, 2022. <URL: https://www.thingiverse.com/thing:2457756> (Year: 2017).*

(Continued)

*Primary Examiner* — Thomas J Hong
*Assistant Examiner* — Carl V Larsen
(74) *Attorney, Agent, or Firm* — Christopher Mayle; Bold IP, PLLC

(57) ABSTRACT

An interactive video game apparatus designed to be operated by an individual's left or right hand whereby the interactive video game apparatus may be placed or positioned in the user's hand whereby once positioned in the user's hand, the user may interact with a virtual reality controller in one receptacle on a handle of the interactive video game apparatus as well as a beverage such as wine, soda, beer, tea as well as a beverage container such as a soda bottle, beer bottle, wine glass positioned in the container of the interactive video game apparatus.

16 Claims, 25 Drawing Sheets

(56) References Cited

U.S. PATENT DOCUMENTS

| | | | | |
|---|---|---|---|---|
| 5,361,871 | A | * | 11/1994 | Gupta .................. G07F 7/02 235/383 |
| 5,671,503 | A | | 9/1997 | Uebelacker et al. |
| 5,831,584 | A | | 11/1998 | Socks et al. |
| 6,092,647 | A | | 7/2000 | Yeh et al. |
| 6,483,440 | B1 | | 11/2002 | Welch et al. |
| D829,263 | S | | 9/2018 | Andersen |
| 10,459,518 | B2 | | 10/2019 | Lutnick et al. |
| 10,488,659 | B2 | | 11/2019 | Boger et al. |
| 2005/0045656 | A1 | | 3/2005 | Veverka et al. |
| 2006/0252553 | A1 | * | 11/2006 | Goode ................. A63F 13/08 463/47 |
| 2015/0243086 | A1 | * | 8/2015 | Denis ............... G06F 3/04847 345/173 |
| 2016/0062489 | A1 | * | 3/2016 | Li ....................... G06F 3/017 345/163 |
| 2016/0272100 | A1 | * | 9/2016 | Lliorca ................ A47G 23/02 |
| 2016/0350973 | A1 | * | 12/2016 | Shapira ................ G06F 3/017 |
| 2018/0095542 | A1 | * | 4/2018 | Mallinson ............. G06F 1/163 |
| 2018/0361235 | A1 | * | 12/2018 | Hunter ................. H04L 67/306 |
| 2019/0087019 | A1 | * | 3/2019 | Raja ................... G06F 3/012 |
| 2020/0090463 | A1 | * | 3/2020 | Mohrhardt ........... G07F 17/3244 |
| 2021/0019036 | A1 | * | 1/2021 | Wang .................. G06F 3/014 |

OTHER PUBLICATIONS

PDP Gaming Joy Con Charging Full Size Grip Plus: Red/Blue—Nintendo Switch. Amazon.com. Online. Aug. 25, 2020. Accessed via the Internet. Accessed Jan. 15, 2022. <URL: https://www.amazon.com/Gaming-Charging-Full-Size-Grip-Plus/dp/B08FCWW7L6/ref=sr_1_6?keywords=joycon+grip&qid=1642281581&sr=8-6> (Year: 2020).*

VR Beer Finder, thingiverse.com. https://www.thingiverse.com/thing:3899456 [Date accessed: Mar. 29, 2020].

VR Accessories Silicone Gelshell Skin Cover For Oculus Quest Controllers, alibaba.com. https://www.alibaba.com/product-detail/VR-Accessories-Silicone-Gelshell-Skin-Cover_62337293379.html?spm=a2700.galleryofferlist.normalList.85.7796a24fQSt3qA [Date accessed: Mar. 29, 2020].

Dual Handles Gamepad for Rift Controllers Playing Beat Saber, alibaba.com. https://www.alibaba.com/product-detail/Dual-Handles-Gamepad-for-Rift-Controllers_60840306868.html?spm=a2700.galleryofferlist.normalList.110.7796a24fQSt3qA [Date accessed: Mar. 29, 2020].

Knock Proof Silicone Protective Skin Cover Case for Htc Vive Controllers, alibaba.com. https://www.alibaba.com/product-detail/Knock-Proof-Silicone-Protective-Skin-Cover_62264906900.html?spm=a2700.galleryofferlist.normalList.288.6a6051e9j3QOgx [Date accessed: Mar. 29, 2020].

Silicone Protective Case for Oculus Quest/rift SVR Controller, aliexpress.com. https://www.aliexpress.com/Item/33056666818.html?spm=a2g0o.productlist.0.0.9ed4568fNv1QD1&algo_pvid=9e61c3b9-21e4-4d32-8e49-dd57ebc06490&algo_expid=9e61c3b9-21e4-4d32-8e49-dd57ebc06590-40&btsid=1493cd1a-97f6-4813-ae82-aex29076d3c0&ws_ab_test=searchweb0_0,searchweb201602_4,searchweb201603_55 [Date accessed: Mar. 29, 2020].

1 Pair Silicone VR Grip Cover Scratch Shock Proof Skin for oculus Quest / Rift S Controller Protective Skin, aliexpress.com. https://www.aliexpress.com/item/4000295815653.html?spm=a2g0o.productlist.0.0.9ed4568fNv1QD1&algo_pvid=9e61c3b9-21e4-4d32-8e49-dd57ebc06590&algo_expid=9e61c3b9-21e4-4432-8e49-dd57ebc06590-32&btsid=1493cd1a-97f6-4813-ae82-aec29076d3c0&ws_ab_test=searchweb0_0,searchweb201602_4,searchweb201603_55 Date accessed: Mar. 29, 2020.

* cited by examiner

SYSTEM AND METHOD FOR AN INTERACTIVE CONTROLLER

CROSS REFERENCE TO RELATED APPLICATIONS

This application claims priority to Provisional Application No. 63/079,661 filed on Sep. 17, 2020 which is incorporated in its entirety.

FIELD OF THE DISCLOSURE

This disclosure relates generally to the field of interactive video game apparatuses and more particularly an interactive video game apparatus designed to hold a beverage or beverage container and controller whereby the interactive video game apparatus houses a series of sensors allowing for interactive video game apparatus to accurately track & display/retarget in real-time a corresponding object into a plurality of virtual environments.

BACKGROUND

The video game industry has become larger than ever and has spawned many innovations in both software and related hardware where users across the globe may communicate with one another. Video games have become more advanced and controls are an important part for being fully immersed in the virtual world. Video games have evolved to take advantage of the nearly instantaneous global communications provided by the Internet in order to provide rich multiplayer online gaming experiences where players from all over the world compete and/or interact with one another. In real-life social situations, having drinks is incredibly commonplace. While in virtual reality, where there is massive hope that the technology will make digital interactions much more realistic & lifelike, there currently isn't a means to get together over a drink. Thus, there is this huge component of the real-world social experience that is not currently taking place in the virtual world and without the means to drink in social situations, the growth of social VR interaction is stunted. Thus, there is a need for an apparatus that easily replicates the social drinking experience in VR.

SUMMARY

The embodiments in the present invention are directed to an apparatus for interacting with an interactive application, comprising: a housing having a container, the container holding a liquid or liquid container, a handle extending from a base of the housing, the handle for holding a controller that is configured to be held by a first hand of a user, and one or more sensors for three dimensional orientation & reconstruction of a virtual representation of the apparatus, the apparatus having a spout positioned over the container, whereby the spout and the container surround the liquid or the liquid container whereby the handle has one or more apertures to provide access for one or more inputs on the controller, whereby the handle has a gripping surface, whereby the housing has one or more controls, the apparatus further including one or more processors coupled to one or more databases and at least one computing device coupled to the one or more processors and the one or more databases, whereby the at least one computing device performs steps of generating a virtual environment, determining a length of the liquid container in the container from an input of the one or more controls, generating a representation of the liquid container in the virtual environment, storing a liquid container catalogue on the one or more databases, receiving content of the liquid container from one or more input devices, recognizing the liquid container using Optical Character Recognition technology and comparison from searching the liquid container catalogue, recognizing a visual symbol on the liquid container to determine the liquid container, connecting the user and a second user into the virtual environment by a bump between the apparatus and a second apparatus whereby a location and time of the apparatus and the second apparatus is determined, determining from the one or more sensors that the apparatus has been placed down on a table, generating a representation of the liquid container in the container in the virtual environment, and generating an avatar of the user, whereby the one or more sensors are one or more digital scales capable for determining an amount of liquid in the liquid container.

The embodiments in the present invention are also directed to an apparatus for interacting with an interactive application, including a housing having a container, the container holding a liquid or liquid container, a handle extending from a base of the housing, the handle for holding a controller that is configured to be held by a first hand of a user, one or more sensors for three dimensional orientation & reconstruction of a virtual representation of the apparatus, one or more processors coupled to one or more databases and at least one computing device coupled to the one or more processors and the one or more databases, whereby the at least one computing device performs steps of generating one or more virtual environments that are selectable by the user to interact with one or more second users, connecting the user and the one or more second users into the one or more virtual environments by an invite from the user, connecting the user and the one or more second users into the one or more virtual environments by a bump between the apparatus and a second apparatus whereby a location and time of the apparatus and the second apparatus is determined, storing a liquid container catalogue in the one or more databases, determining a length of the liquid container from an input of the one or more controls, generating a representation of the liquid container in the one or more virtual environments, receiving content of the liquid container from one or more input devices, recognizing the liquid container using Optical Character Recognition technology and comparison from searching a stored liquid container catalogue.

The embodiments are also directed to an apparatus for interacting with an interactive application, the apparatus including: a housing having a container, the container holding a liquid or liquid container, a port/dock/or handle extending from (or integrated into a surface of) the housing, the port/dock/or handle for holding a controller that is configured to be grasped by a first hand of a user, and one or more sensors for three-dimensional orientation & reconstruction of a virtual representation/reconstruction of the apparatus, the apparatus allowing for seeing a virtual representation of the apparatus whereby the drinking orifice of the virtual representation of the apparatus is aligned with the scale and three-dimensional position of the drinking orifice of the apparatus, whereby the user moves the apparatus and the virtual representation of the apparatus to a user's mouth, whereby the movement occurs in physical and digital space simultaneously through synchronized real-Time transmission of three-dimensional positions & images of the apparatus and the virtual reconstruction of the apparatus to the viewer.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DESCRIPTION

Figure 1:
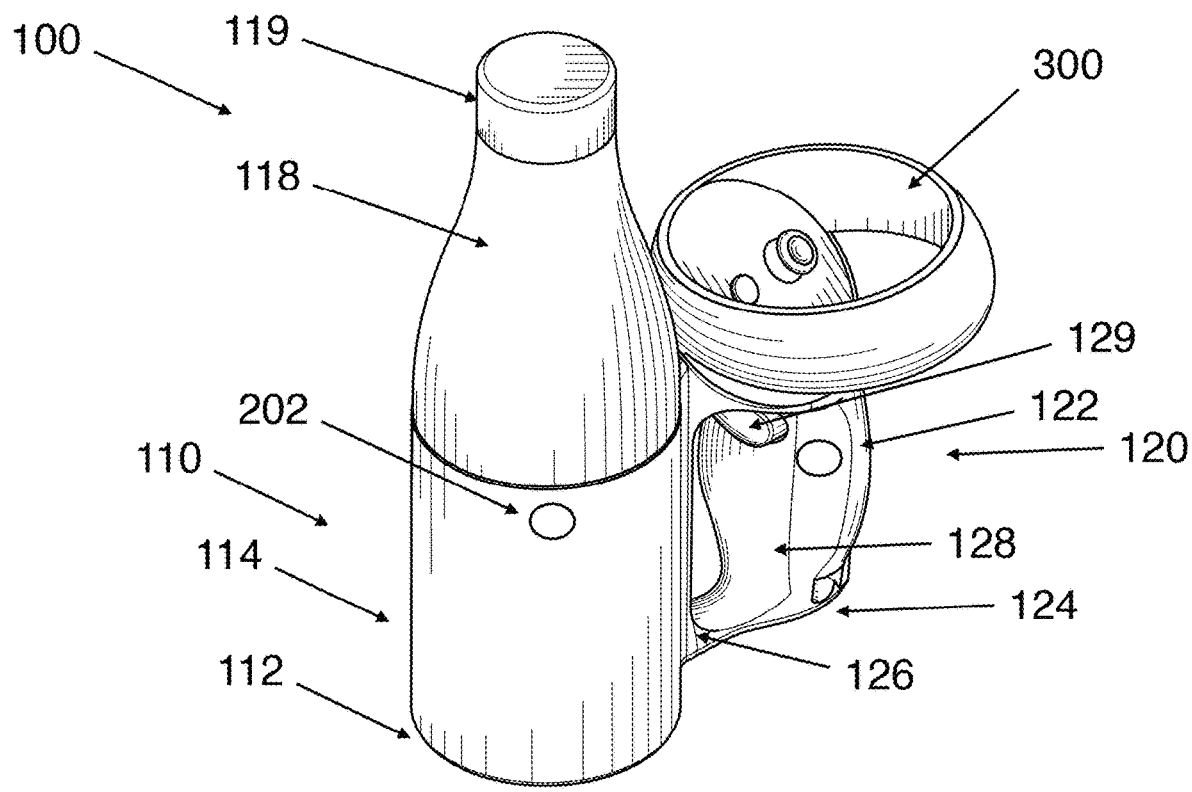
FIG. 1 is an illustration of an embodiment of the video game apparatus.

In the Summary above and in this Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, among others, are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and upper limit is the second number. For example, 25 to 100 mm means a range whose lower limit is 25 mm and upper limit is 100 mm.

Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The present description includes one or more embodiments for an interactive video game apparatus designed to be operated by an individual's left or right hand whereby the interactive video game apparatus may be placed or positioned in the user's hand. Once positioned in the user's hand, the user may interact with a virtual reality controller in one receptacle on a handle of the interactive video game apparatus as well as a beverage such as wine, soda, beer, tea as well as a beverage container such as a soda bottle, beer bottle, wine glass positioned in the container of the interactive video game apparatus. In other embodiments, the beverage may instead be another type of liquid or fluid such as lotion, oil, soup, cleaning solution, shampoo, soap, or any other type of liquid.

The invention also comprises a visual representation in 3D digital space of the container, the beverage, or the container and beverage. In addition, there are sensors that will orient and align the 3D position of the physical container and it's visual representation in real-time for the purpose of drinking in physical and digital space simultaneously. The sensors may be inside of the controller, a tracking device, affixed with adhesive, or attached to the receptacle. The sensors may also be purely visual and incorporated into the shape of the receptacle. The sensors may receive any number of content including video and audio whereby this captured content is sent to microprocessor 207 which then recognizes those captured content (either by their size, position, orientation, color, markings, movement sequence, etc) and then retargets (substitutes/overlays) the last orientation of that image with another digital images in real-time (at a rate of 10 fps-300 fps) to be displayed on a video screen such as display 270.

Elements included herein are meant to be illustrative rather than restrictive. Persons having ordinary skill in the art relevant to the present disclosure may understand there to be equivalent elements that may be substituted with the present disclosure without changing the essential function or operation of the controller.

Interactive video game apparatus 100 may have a power system designed to provide energy to the circuits and components of interactive video game apparatus 100 during the process of operating interactive video game apparatus 100. Interactive video game apparatus 100 may be powered by methods known by those of ordinary skill in the art. In some embodiments, interactive video game apparatus 100 may plug into an electrical outlet using an electrical cord to supply power to the circuits and components of interactive video game apparatus 100. Further, the power system may include a rechargeable battery pack whereby the rechargeable battery is of a charge, design, and capacity, to provide sufficient power to the circuits and components of interactive video game apparatus 100 during operation for a set period of time needed to interact with one or more video games.

In one or more non-limiting embodiments, interactive video game apparatus 100 may have one or more battery compartments for receiving and holding batteries, such as but not limited to AA or AAA sized conventional batteries. The battery compartment may include one or more electrodes (e.g. conventional electrodes) that are configured to contact electrically conductive surfaces of the battery received inside the compartment. The battery compartments are selectively accessible by removal of a latch cover whereby the battery compartments and the batteries are accessible only when the user removes a removable battery cover or latch mechanism concealing the battery compartment from external view. Interactive video game apparatus 100 may include a latch receiving component that engages with the latch cover concealing battery compartment to facilitate removal and reattachment of the latch cover from interactive video game apparatus 100.

Figure 29:
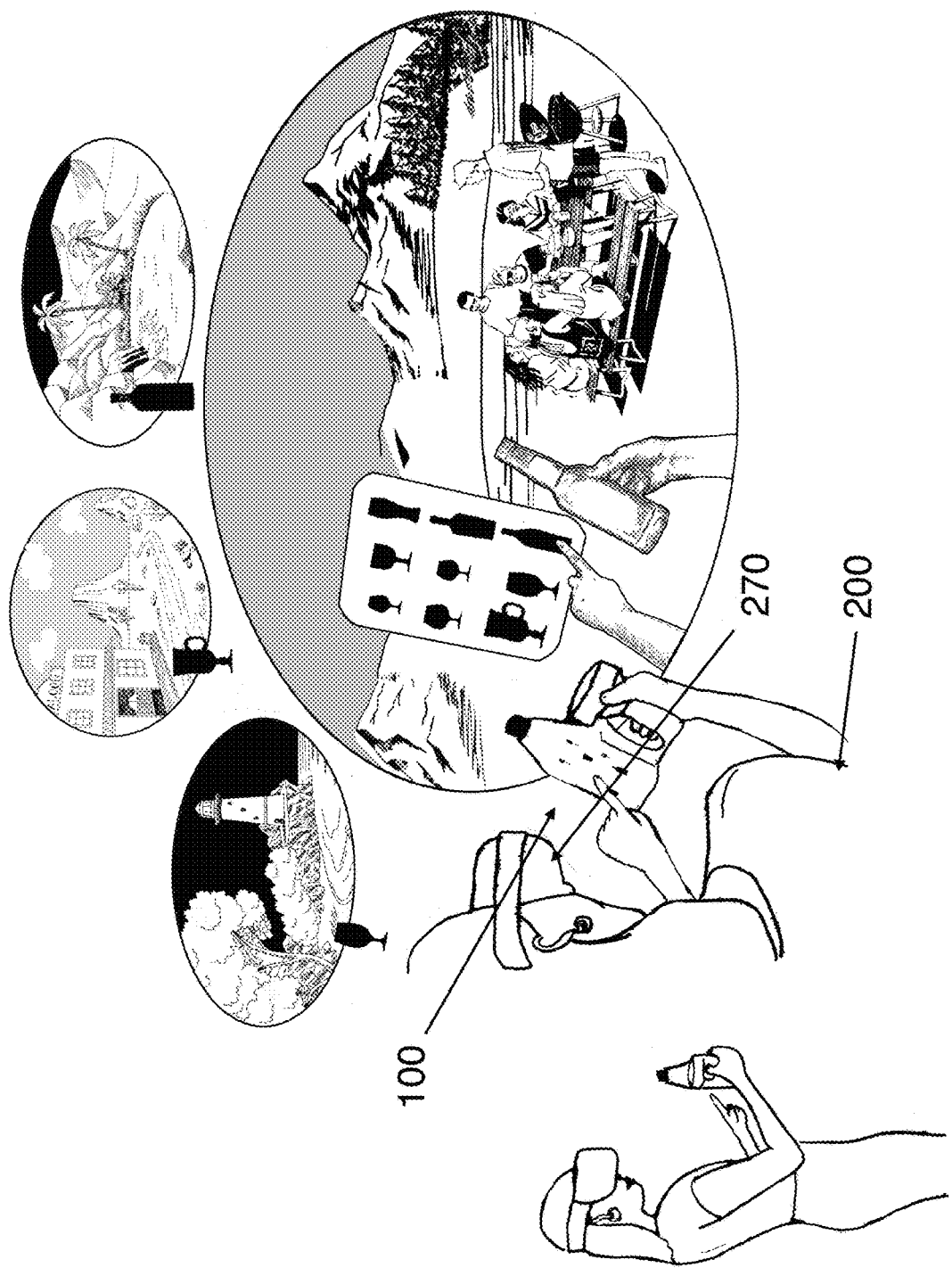
FIG. 29 illustrates interactive video game apparatus being operated by a user.

Turning to FIG. 1, FIG. 1 shows a perspective view of an interactive video game apparatus 100 according to an embodiment of the present invention. In this context, interactive video game apparatus 100 may be considered to be hand-held because it is operated by hand of a user such as user 200, as illustrated in FIG. 29, whether or not the entire controller is fully supported by the user's 200 hand. Interactive video game apparatus 100 may be used by user 200 using their left hand or right hand and is controllable from any side whereby user's 200 hand may grasp interactive video game apparatus 100.

Interactive video game apparatus 100 may have three main components, as illustrated in FIG. 1, including a container such as container 110, a spout such as spout 118, and a controller securing element such as handle 120. However, in other embodiments handle may be a port, dock, or other element. Handle 120 may be permanently attached to container 110 or removably attached such that handle 120 may be positioned on opposite sides of container 110 whereby user 200 may use their right or left hand depending on the orientation. Interactive video game apparatus 100 and the various components including container 110, spout 118, and handle 120 may be made of a plastic, such as injection-molded polycarbonate (PC)/acrylonitrile butadiene styrene (ABS) or polyamide (nylon), metal, or other materials typically used in the manufacturing of interactive video game apparatuses that do not stray away from the intent of the current invention. The material of interactive video game apparatus 100 may exhibit heat resistance, mechanical strength, or rigidity for continuous playing of interactive games without degradation or deformation. FIG. 8-FIG. 13 illustrate other views of FIG. 1.

Container 110 may be comprised of bottom surface 112 and a sidewall 114 directing upward from bottom surface 112 whereby the bottom edges of sidewall 114 are connected to bottom surface 112. With this configuration, sidewall 114 is a cylindrical shaped component with a circular bottom surface 112, however, this is non-limiting, and the shape may be a cube or other three-dimensional shape. Container 110 may be taller and have a greater circumference than handle 120 to allow for greater balance and stability whereby interactive video game apparatus 100 may be placed on a surface such as a coffee table or the floor. Container 110 may be rigid and hollow, acting as housing element having an inner chamber 116 designed for a beverage or beverage container 310 such as a soda can, soda bottle, beer bottle, wine glass or martini glass as well as holding together the components and circuitry of interactive video game apparatus 100.

Figure 2:
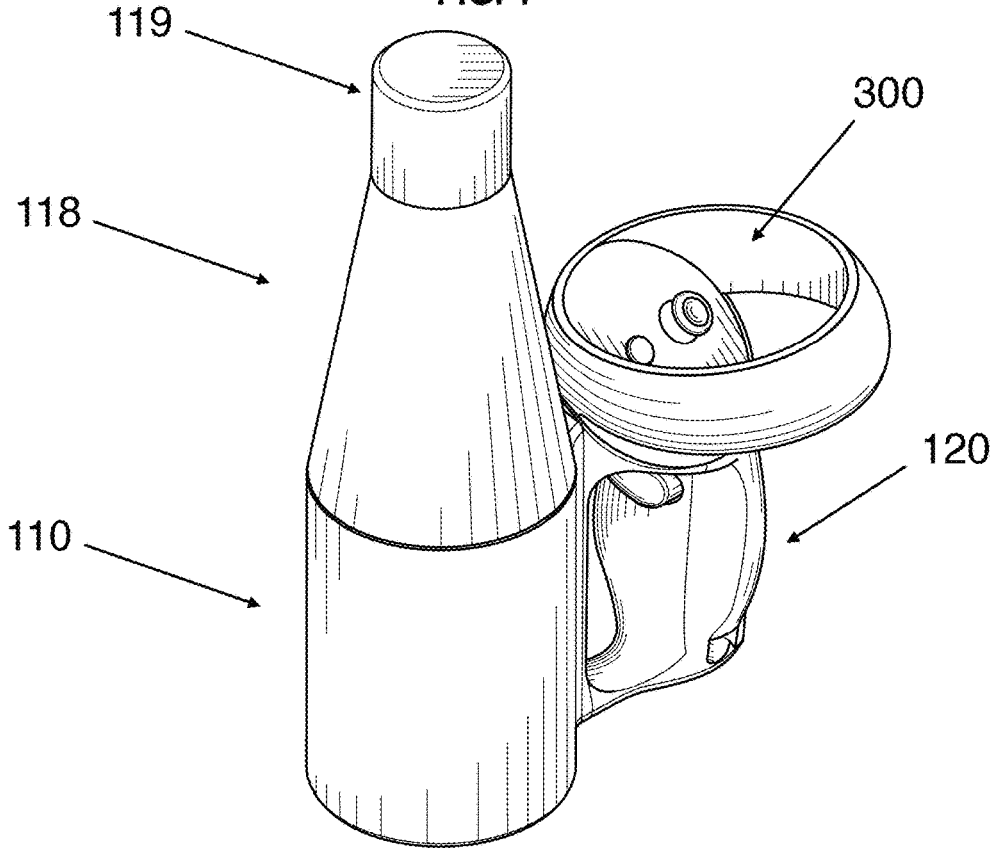
FIG. 2 is an illustration of the video game apparatus with a larger spout cover.
Figure 3:
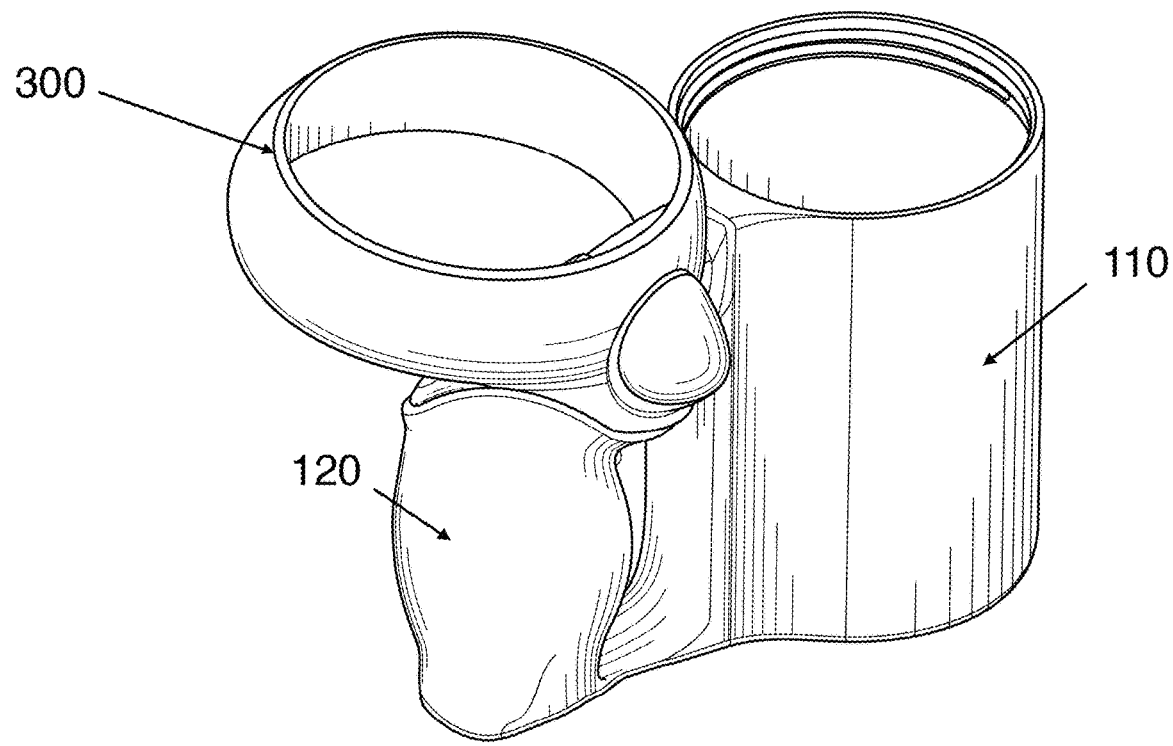
FIG. 3 is an illustration of the video game apparatus with the spout removed.
Figure 4:
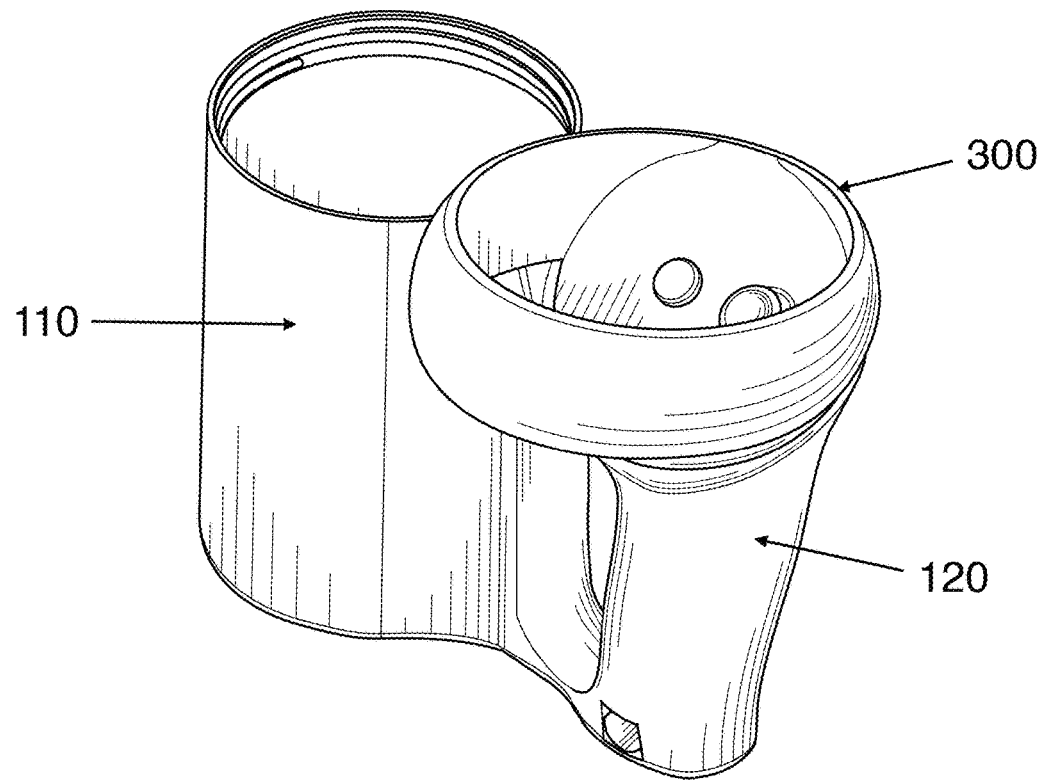
FIG. 4 is another illustration of the video game apparatus with the spout removed.
Figure 7:
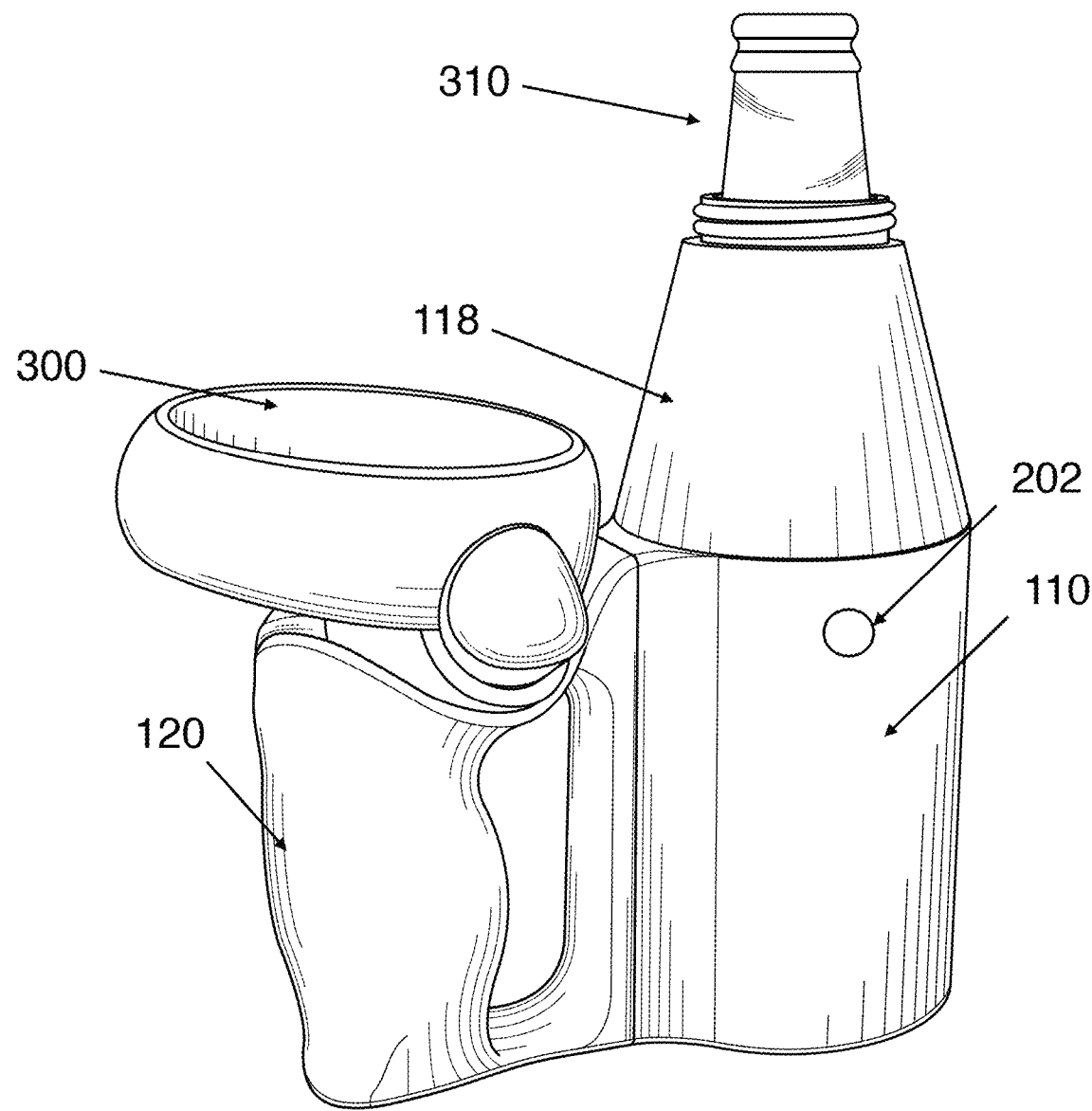
FIG. 7 is an illustration of the video game apparatus with the spout cover removed and a beverage inside.
Figure 8:
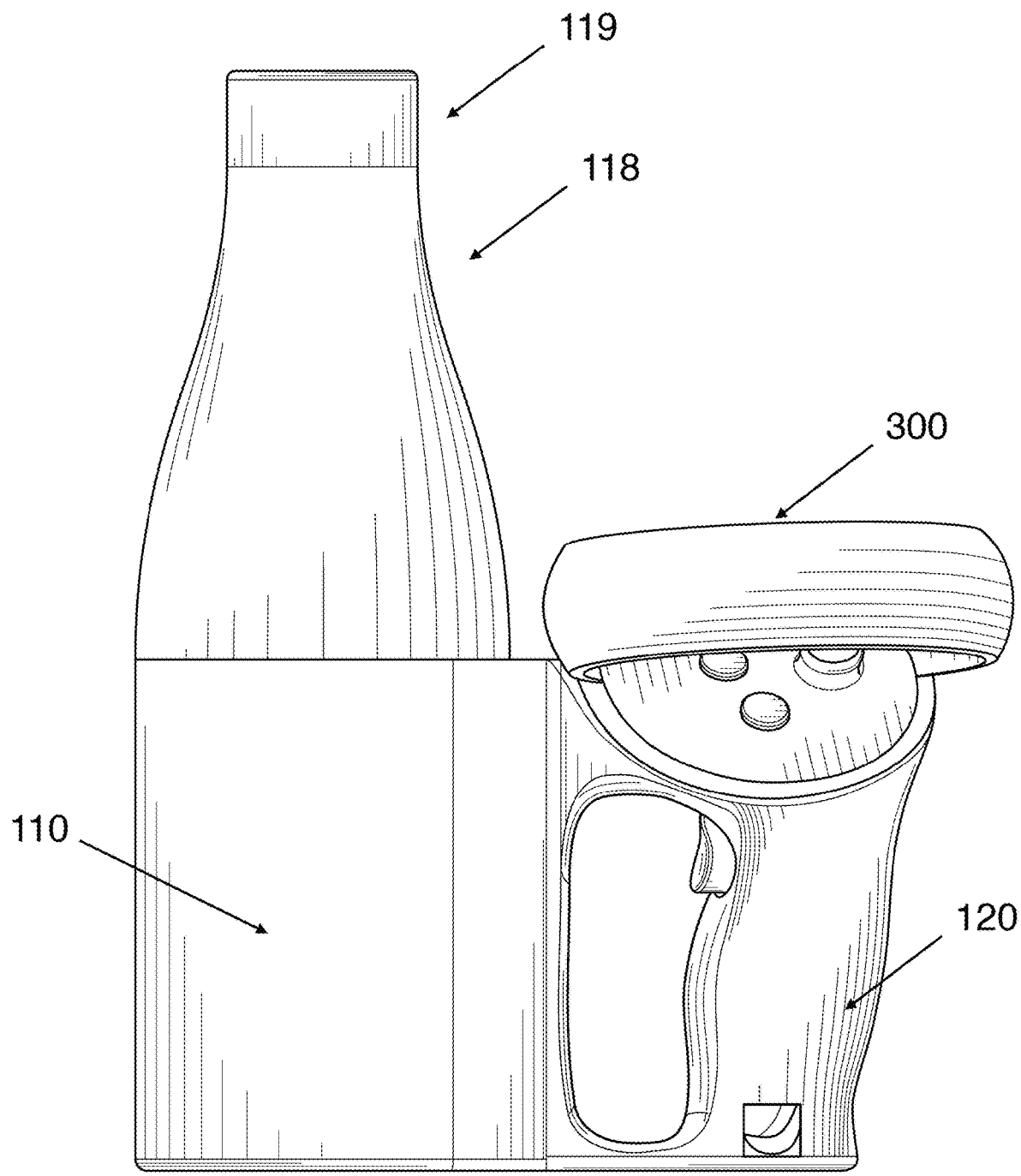
FIG. 8 is another illustration of the video game apparatus of FIG. 1.
Figure 9:
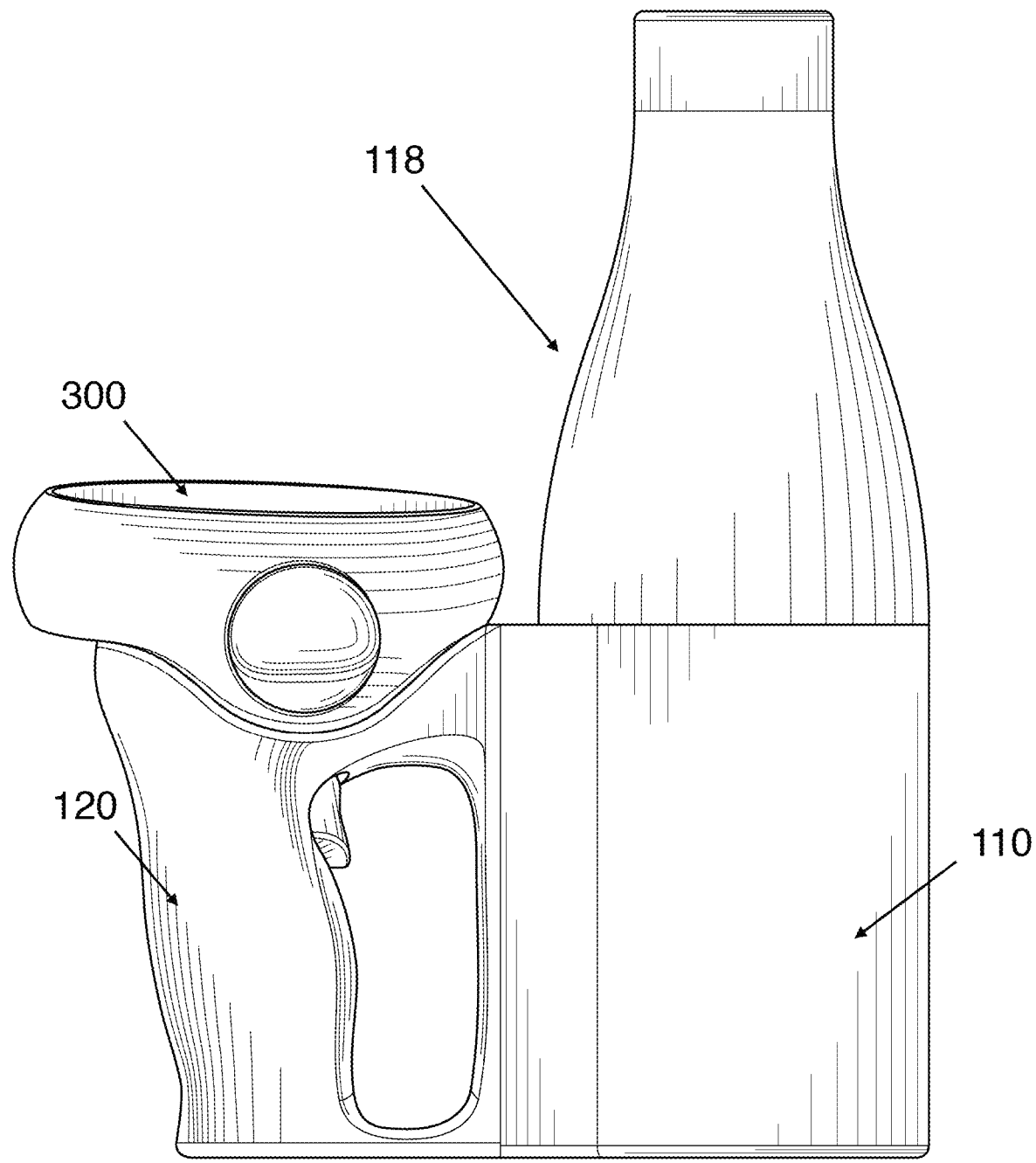
FIG. 9 is another illustration of the video game apparatus of FIG. 1.
Figure 10:
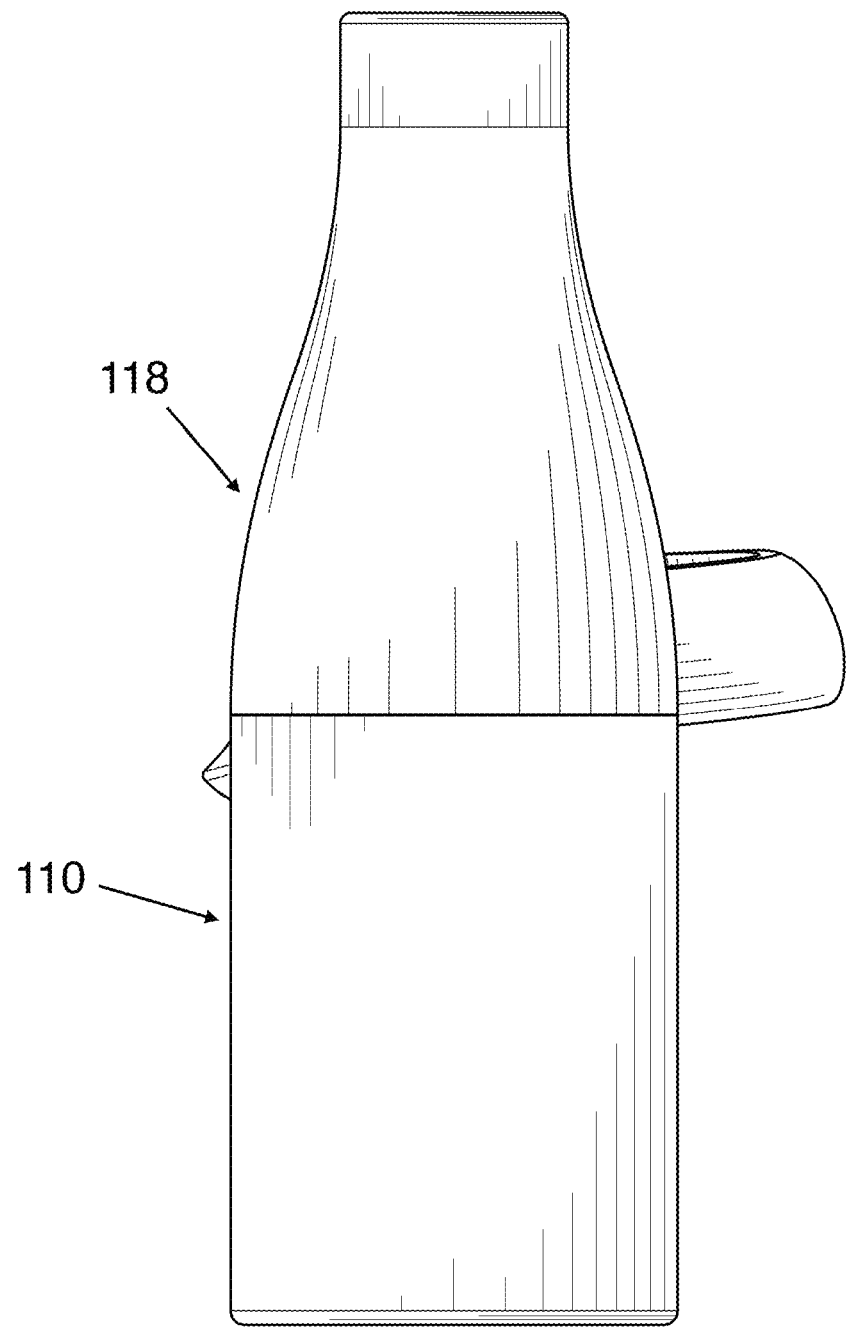
FIG. 10 is another illustration of the video game apparatus of FIG. 1.
Figure 11:
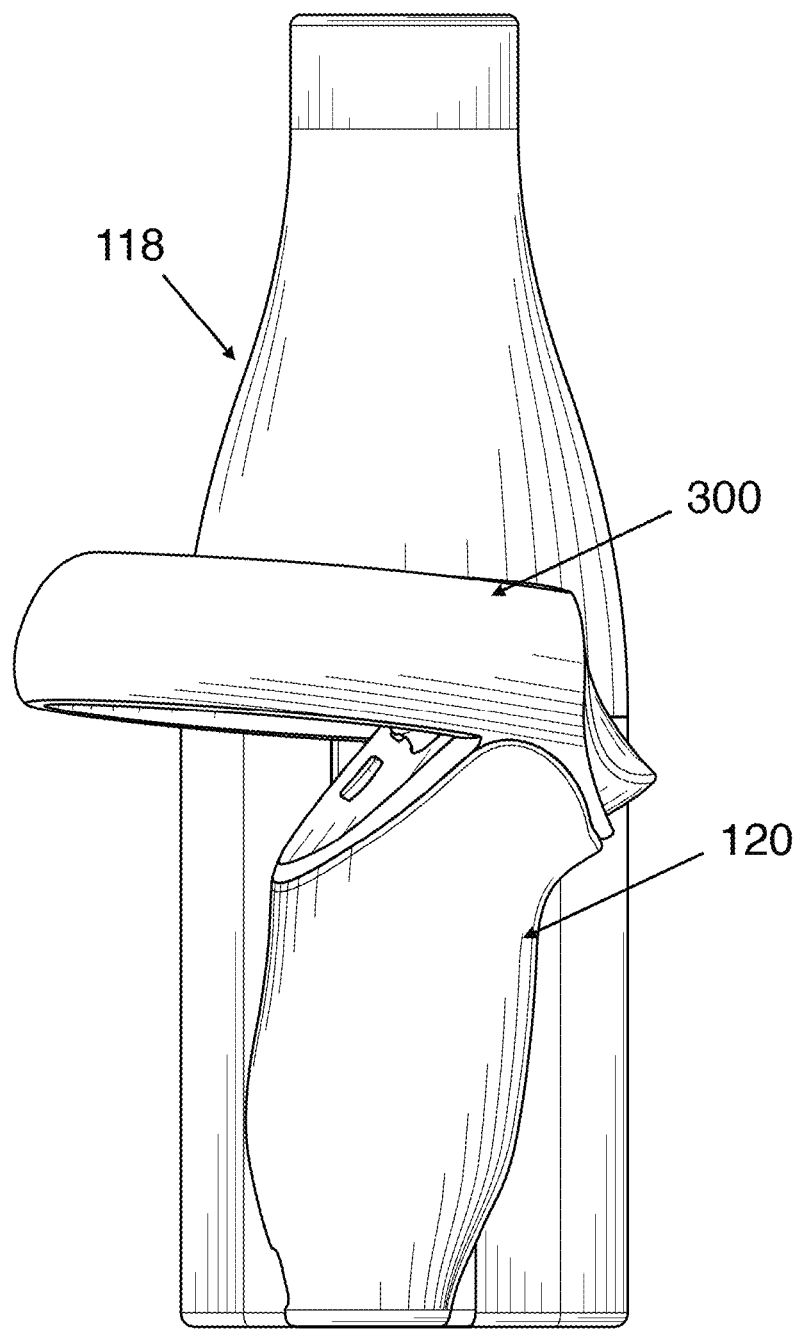
FIG. 11 is another illustration of the video game apparatus of FIG. 1.
Figure 12:
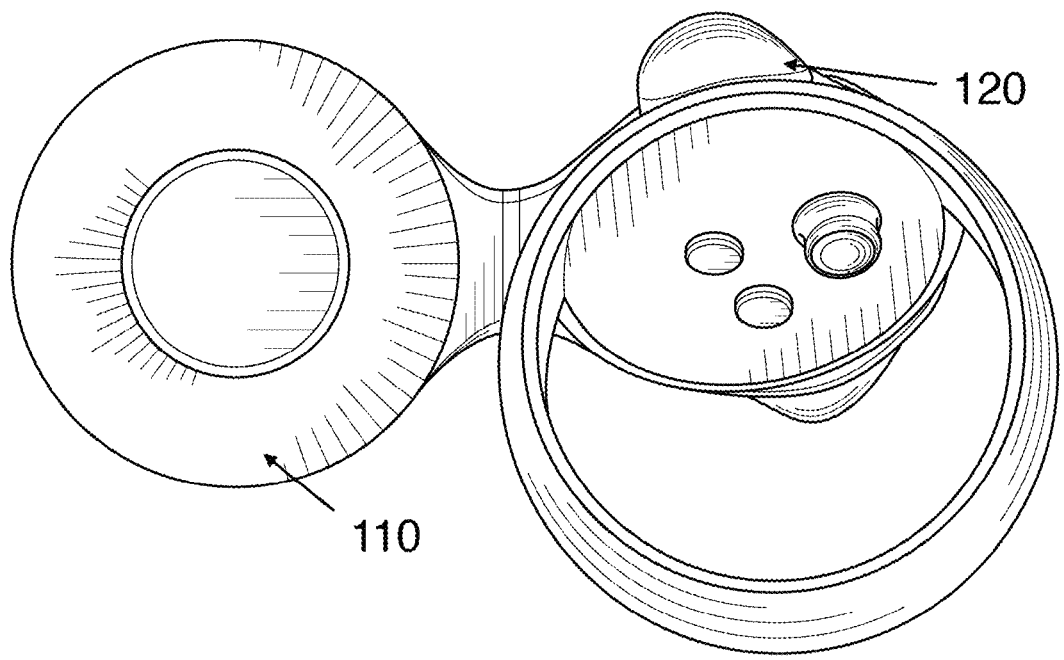
FIG. 12 is another illustration of the video game apparatus of FIG. 1.
Figure 13:
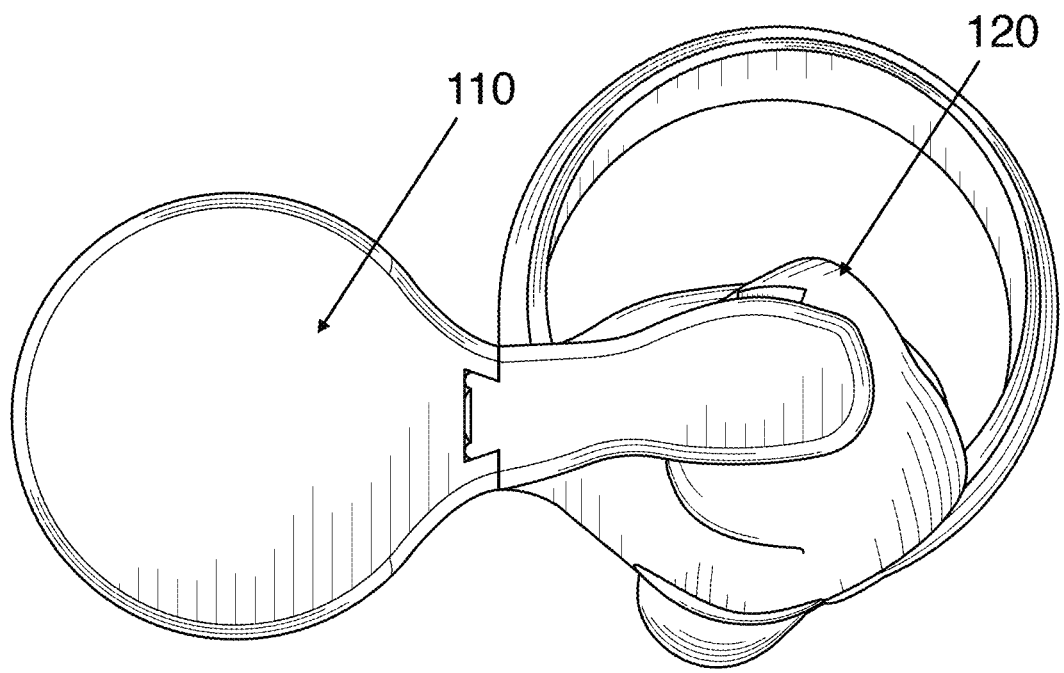
FIG. 13 is another illustration of the video game apparatus of FIG. 1.
Figure 14:
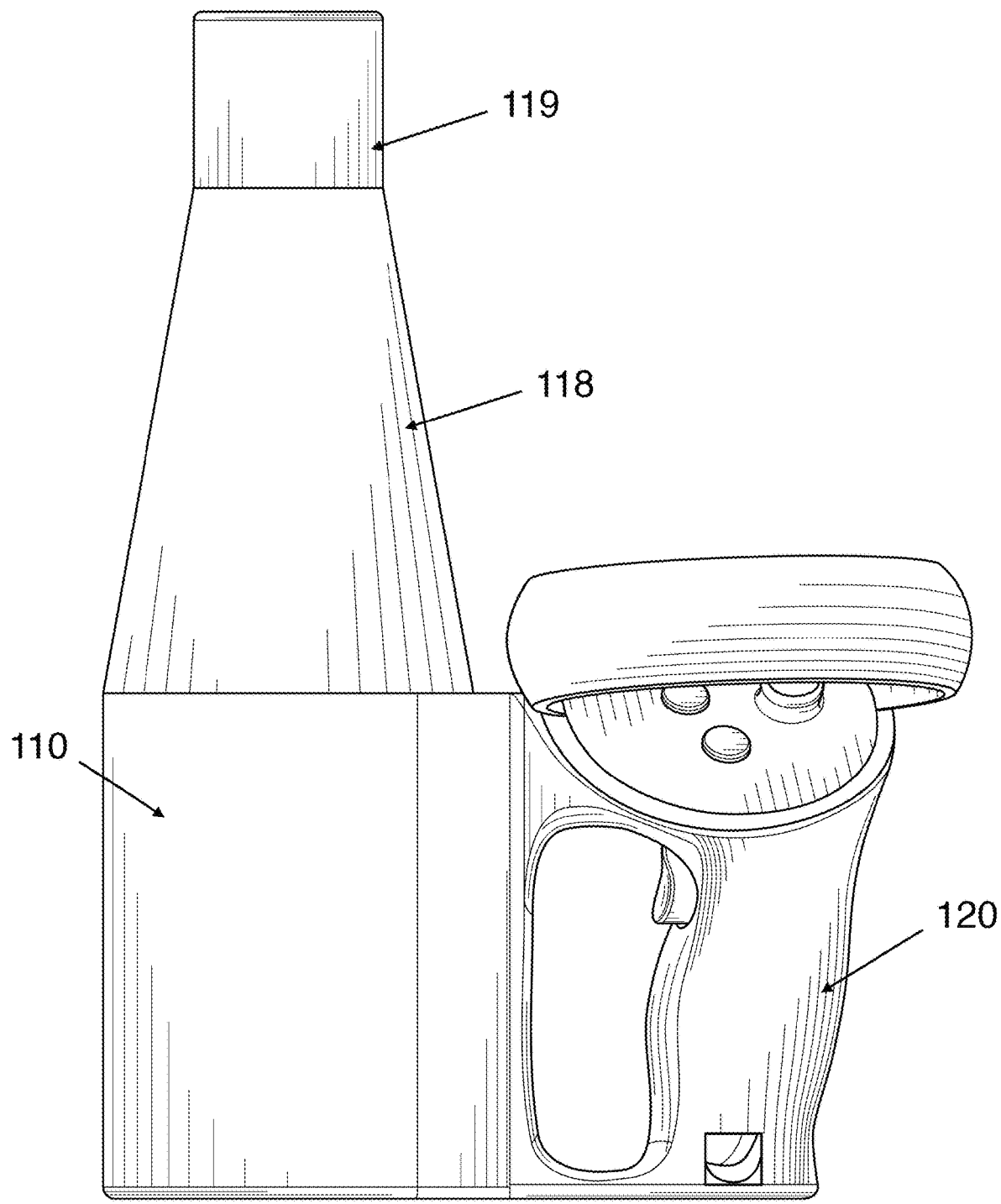
FIG. 14 is another illustration of the video game apparatus of FIG. 2.
Figure 15:
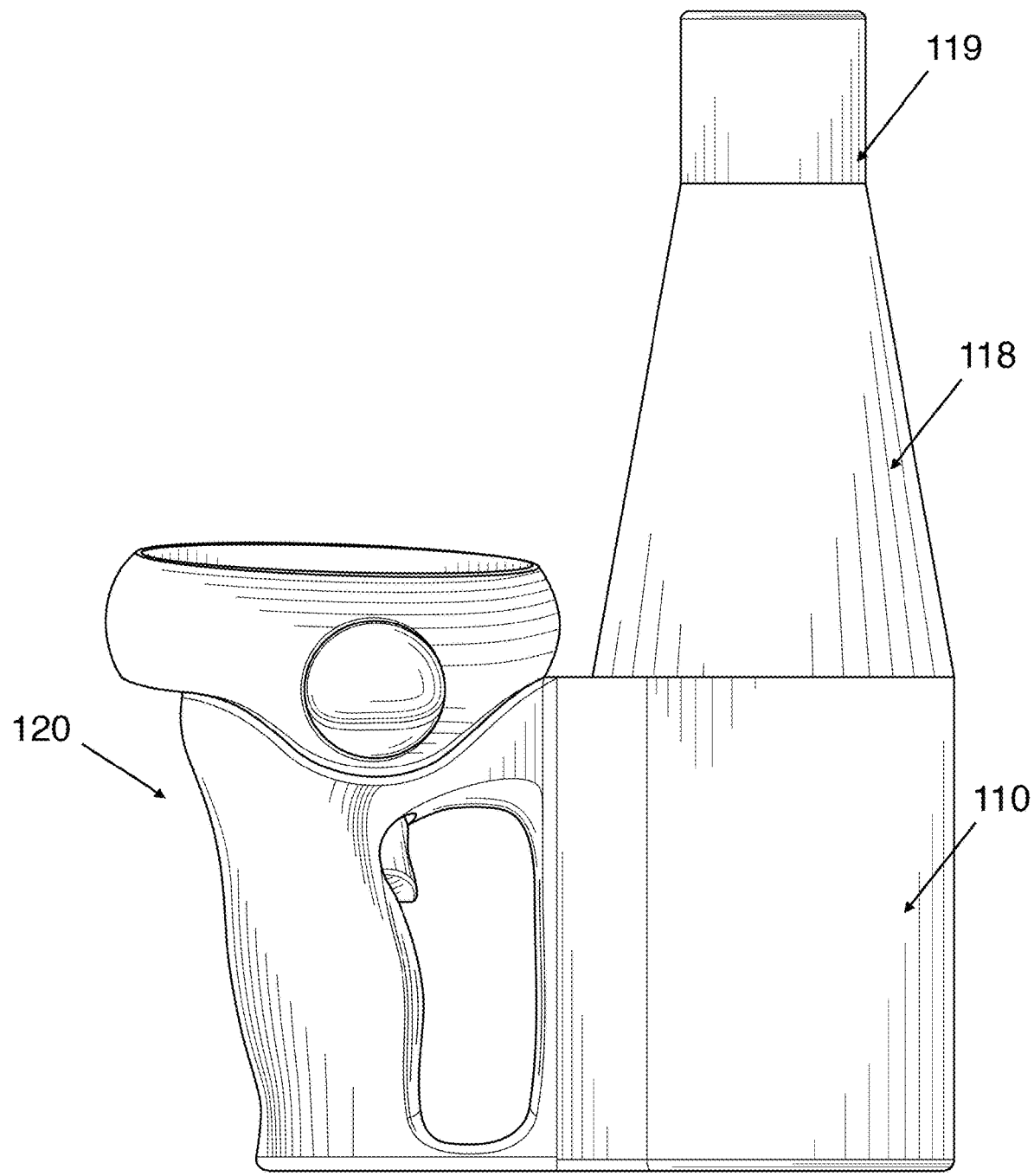
FIG. 15 is another illustration of the video game apparatus of FIG. 2.
Figure 16:
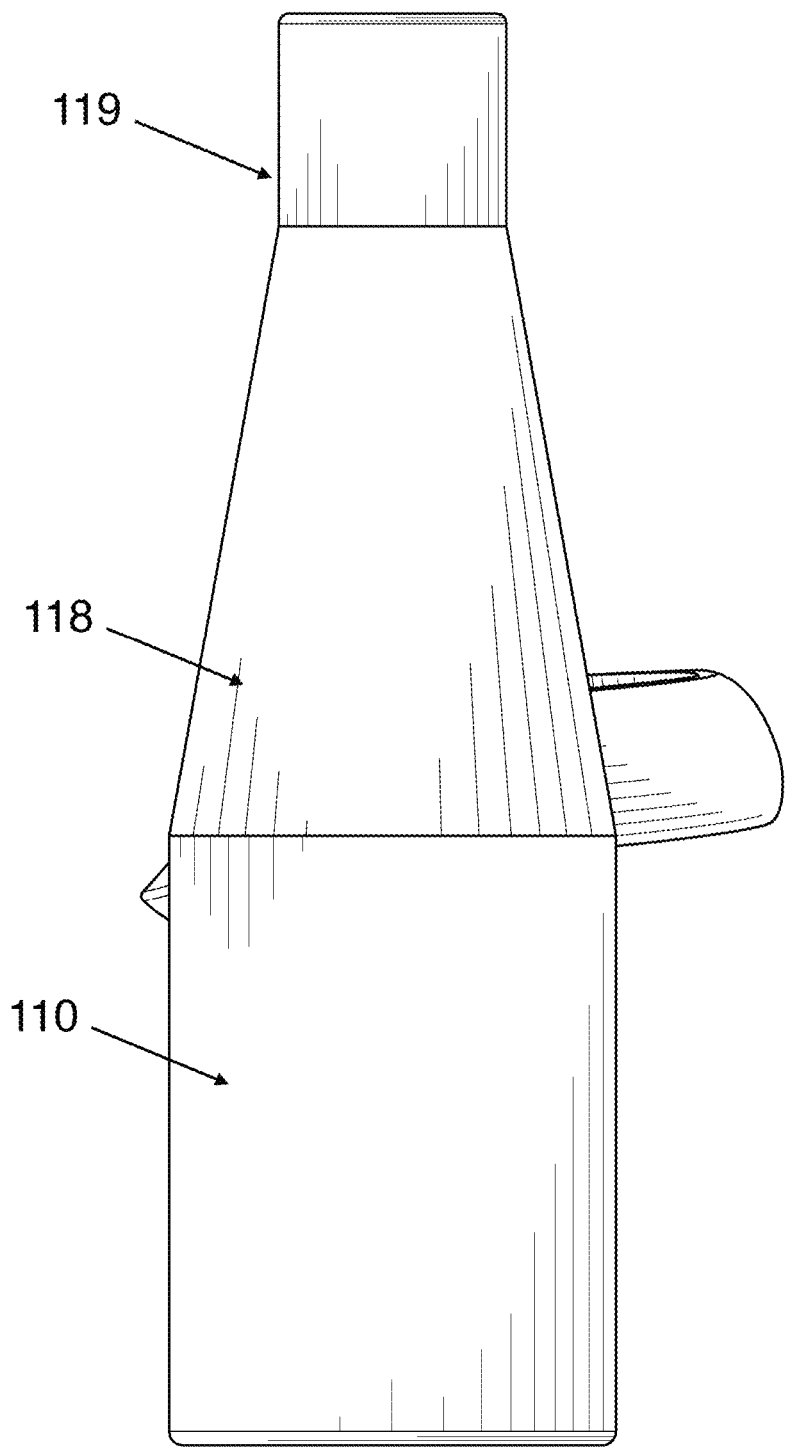
FIG. 16 is another illustration of the video game apparatus of FIG. 2.
Figure 17:
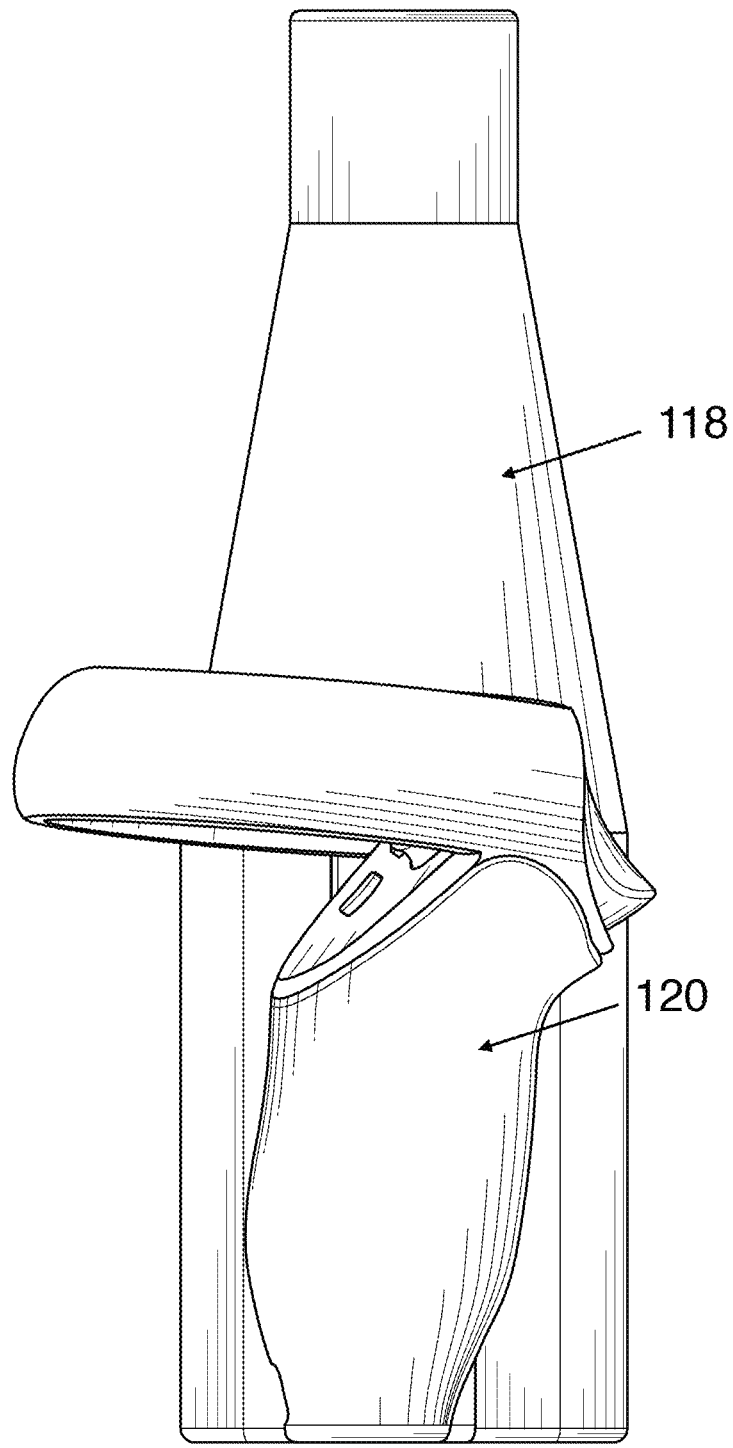
FIG. 17 is another illustration of the video game apparatus of FIG. 2.
Figure 18:
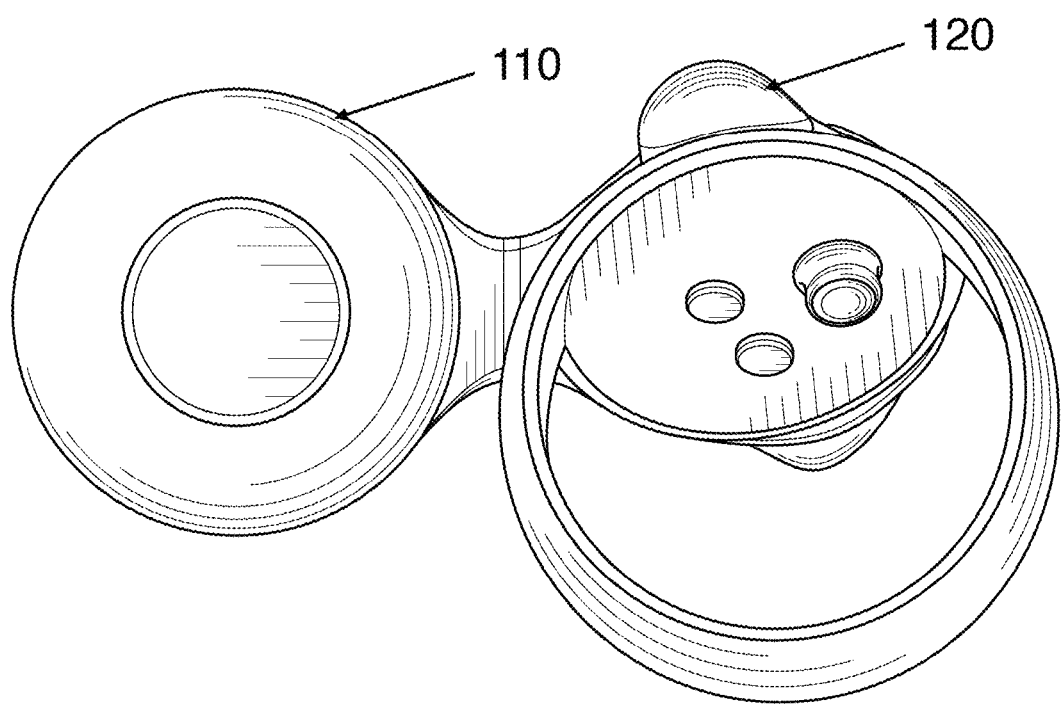
FIG. 18 is another illustration of the video game apparatus of FIG. 2.
Figure 19:
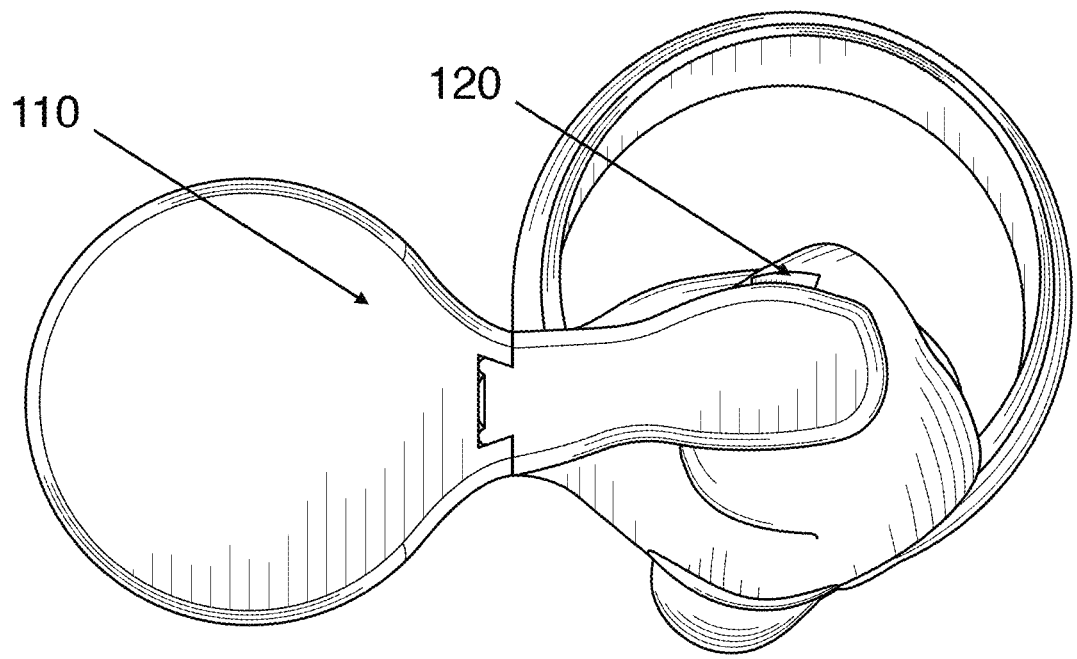
FIG. 19 is another illustration of the video game apparatus of FIG. 2.

Spout 118 may be configured to be placed upon container 110 so that user 200 may drink from spout 118 safely so interactive video game apparatus 100 avoids contact with a head mounted display while user 200 is drinking from interactive video game apparatus 100. Spout 118 may have a cone shape that is generally symmetric about a horizontal and vertical axis passing through the middle of to the bottom surface portion. A sidewall portion extends directly upward and inward from an upper margin of an open bottom surface portion. The sidewall portion then extends upward into an open top surface portion of an oblate spheroid shape allowing access of liquid from the inner chamber whereby the bottom surface portion is of a larger area or equal area or circumference than the top surface portion. The configuration between spout 118 and container 110 allows spout 118 to engage mechanically with container 110 such that user 200 may drink from the top of spout 118. This engagement applies a radial inward force upon container 110 that prevents exiting of liquid from container 110 unless through spout 118. Spout 118 may be removed by applying a force greater than the radial force, such as by user 200 pulling spout 118 away from container 110. FIG. 3 and FIG. 4 as well as FIG. 7 illustrate container 110 with spout 118 removed. In other embodiments spout 118 may be positioned on container by any number of other types of fastening engagements such as a screw on mechanism whereby container 110 has a threaded receiving portion which allows container 110 to engage with threads of spout 118 to stack upon the other and mechanically lock with each other. Spout 118 may have a spout cover 119 that may be placed on top of spout 118 securing a beverage or bottle inside. A larger spout cover 119 is illustrated in FIG. 2 as well as FIG. 14-19.

Handle 120 may be shaped and dimensioned to be grasped by user's 200 hand such that user 200 may manipulate or interact with interactive video game apparatus 100. User 200 may therefore comfortably hold handle 120 without spilling a beverage in container 110 or moving a beverage container 310 positioned in container 110 until desired so as to drink from spout 118 at an angle, or beverage container 310 at an angle. Handle 120 may have a main body 122 comprised of bottom surface 124 and a sidewall 128 directing upward from bottom surface 124 whereby the bottom edges of sidewall 128 are connected to bottom surface 124. Main body 122 may be ergonomically contoured such that user's 200 hand can comfortably grasp interactive video game apparatus 100. Main body 122 may have a slight bend or curve to receive user's 200 palm such that the palm of user 200 rests naturally along sidewall 128.

Figure 20:
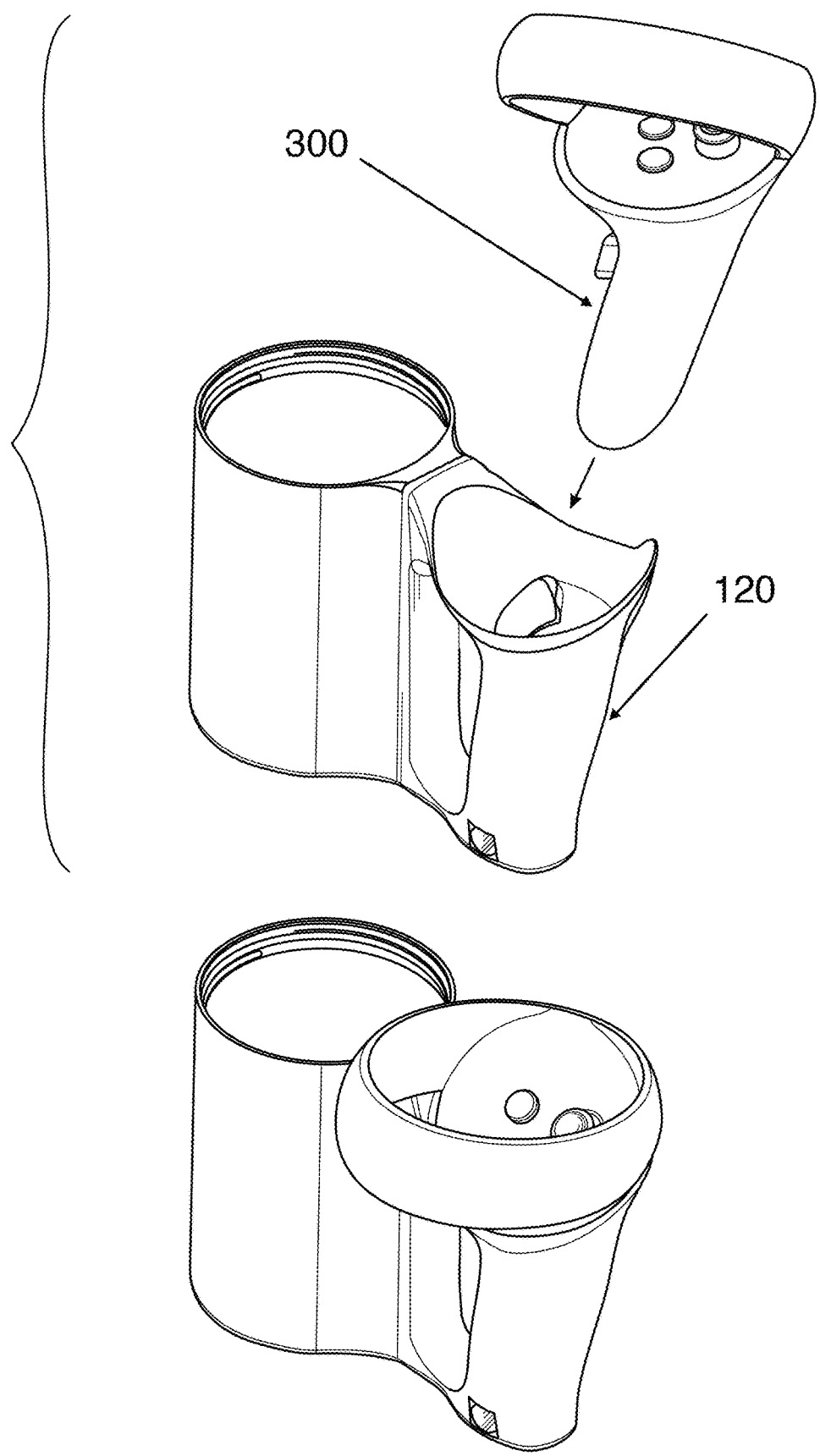
FIG. 20 is illustration of a controller being inserted into video game apparatus.

Main body 122 may be hollow, acting as housing element having an inner chamber designed for holding a virtual reality controller 300 such as an Oculus Quest®, Oculus Rift®, Samsung Gear VR®, HTC Vive®, Google NOLO®, Valve Index®, Sony PSVR®, or other controllers. The housing is designed such that main body 122 holds controller 300 and user 200 may have access to various controls such as the trigger or thumb control which are located above main body 122 when controller 300 rests inside of the housing. For instance, a thumb stick designed to control movement and viewing (camera angles or first-person perspective view) of an avatar and are intended to be operated by user 200. FIG. 20 illustrates controller 300 being placed into handle 120.

Sidewall 128 may have one or more apertures such as aperture 129 functioning as the receiving component whereby a button of controller 300 placed inside of handle 120 may pass through sidewall 128 so that the button is accessible for user 200. When user's 200 hand is positioned on handle 120, user's 200 thumb or fingers may comfortably position their hand around sidewall 128 to select the button. In other non-limiting embodiments, direction pads, depressible in four different directions (e.g., up, down, left, and right), may pass through aperture 129.

Main body 122 of handle 120 may be comprised of gripping surface material or any adhesive whereby the material prevents slippage between the palm of user 200 and interactive video game apparatus 100. The coverage area of the material may be an externally applied adhesive coating or the material may be impregnated within main body 122 itself.

Figure 5:
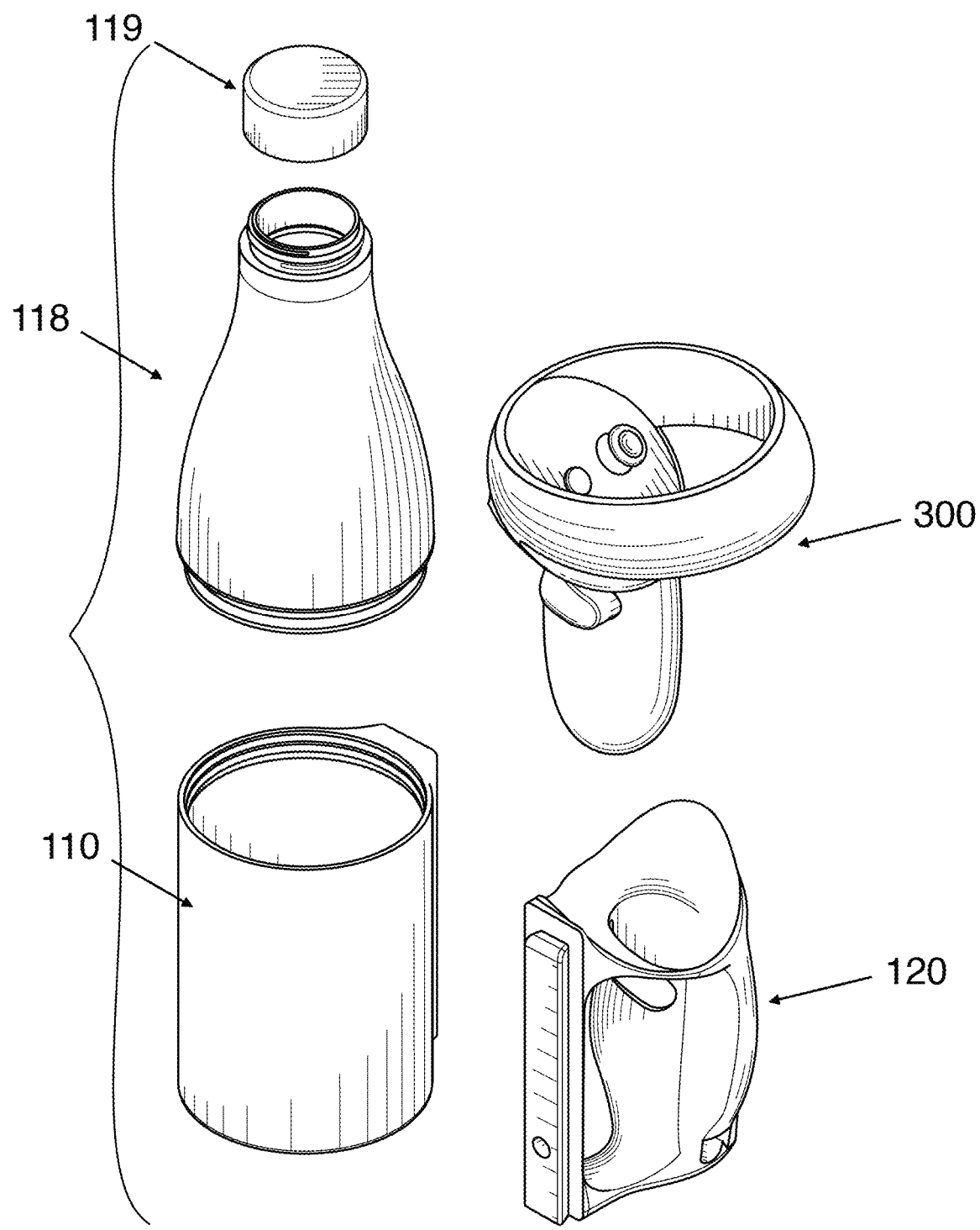
FIG. 5 is an illustration of the video game apparatus of FIG. 1 with the components separated.
Figure 6:
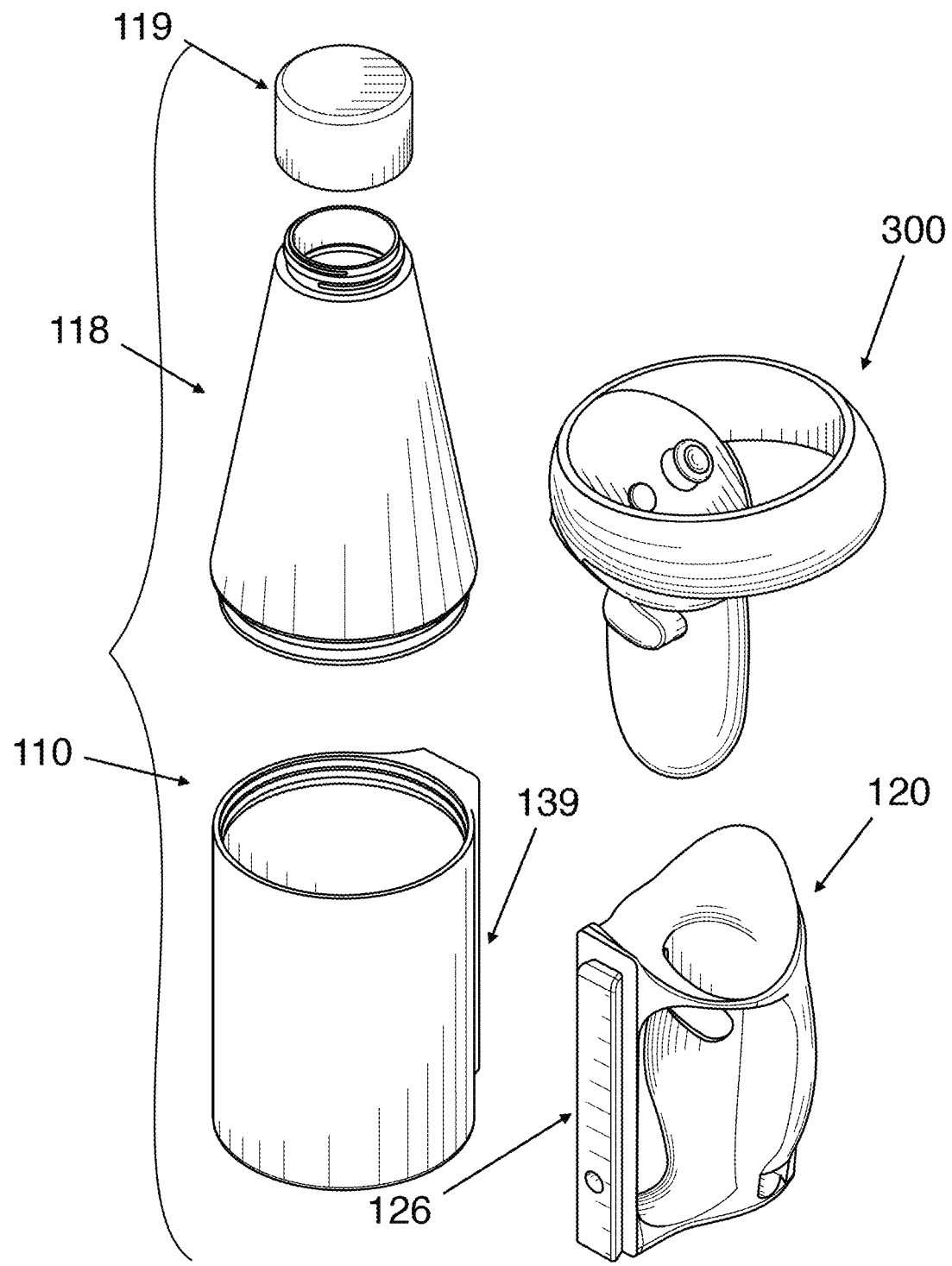
FIG. 6 is an illustration of the video game apparatus of FIG. 2 with the components separated.

In one or more non-limiting embodiments, main body 122 may have one or more buttons such as button 222 that extend outward from sidewall 128 whereby when user's 200 hand is positioned on handle 120, the fingers of user 200 users may rest upon on sidewall 128 to interact with buttons with little to no movement during gameplay. Button 222 may be pressed by a thumb, index, middle, ring, or pinky finger of user's 200 hand or a combination of both. Button 222 may have a spring mechanism or compressible material under buttons bias to the original position of buttons protruding from sidewall 128 whereby the spring mechanism or compressible material stops the buttons from staying down when pushed and pushes buttons back up when user releases button 222. Button 222 may be connected to one or more switches that are connected to a circuit board which sends these signals to the microprocessor, which compares that data with the instructions in the game software for that specific input from the activation of the buttons in some non-limiting embodiments buttons 222 may operate as touch panels with capacitive sense capabilities which are connected to the microprocessor, whereby when user 200 touches button 222, the properties of the charged touch panel are altered in that spot, thus registering when button 222 was touched. Handle 120 may have a connecting component 126 for container 110 to attach upon whereby component 126 may be received by sliding into a receptacle 139 on container 110, as illustrated in FIG. 5 and FIG. 6.

One or more sensors 202 may be mounted on components of interactive video game apparatus 100 such as container 110, spout 118, or handle 120, as illustrated in FIG. 7. Sensor data may be received by one or more computing devices or remotely be received by a server, whereby sensor data is analyzed and the corresponding action or event is determined in response. Sensors 202 may be any type of sensor or combinations thereof. Examples of sensors 202 may include cameras, pressure sensors, GPS, Local Positioning System (LPS), altimeters, which can identify where the user is located in a space, motion sensors (e.g., accelerometers), which can generate data associated with the orientation of interactive video game apparatus 100 or if the interactive video game apparatus 100 is moving in a specific direction. Sensors 202 may be affixed with adhesive to video game apparatus 100, or otherwise connected to video game apparatus 100. In other embodiments, sensors 202 may be in connected controller 300 or other attached device.

Sensors 202 may be used to orient and align the 3D position of the physical and digital vessels in real-time for the purpose of drinking in physical and digital space simultaneously. Sensors 202 may also be used in part to determine the amount of beverage that is in container 110 or in beverage container 310 positioned in container 110 as well as the angle of and position of the user's head, as illustrated in FIG. 7. This information may then be used to select what images and video are presented to the user through a display and how they are oriented for presentation to the user. For example, if the user is in a virtual bar, interactive video game apparatus 100 may mimic the real world positioning in the virtual bar. Other types of sensors may include biometric sensors that can sense the user's heart rate, temperature, brain wave activity, perspiration or other biometric sensors. In one or more embodiments, GPS may be combined with information from other position sensors. For example, the GPS device may provide coarse position data signifying that interactive video game apparatus 100 is in a room; whereas, other position sensors can provide fine position data inside that room. In some embodiments, container 110 may have one or more digital scales capable of determining the weights and liquid level of beverage container 310.

Interactive video game apparatus 100 may have a light source (e.g., a light emitting diode ("LED")) on the interactive video game apparatus 100 such as along the perimeter of container 110. The light source may light up or flash colors when certain events occur such as if user 200 is receiving an alert. In other embodiments, interactive video game apparatus 100 may have a speaker assembly that produces an audible sound when events such as to notify and alert users 200 and a microphone assembly to transmit audible sound to other users 200.

Figure 21:
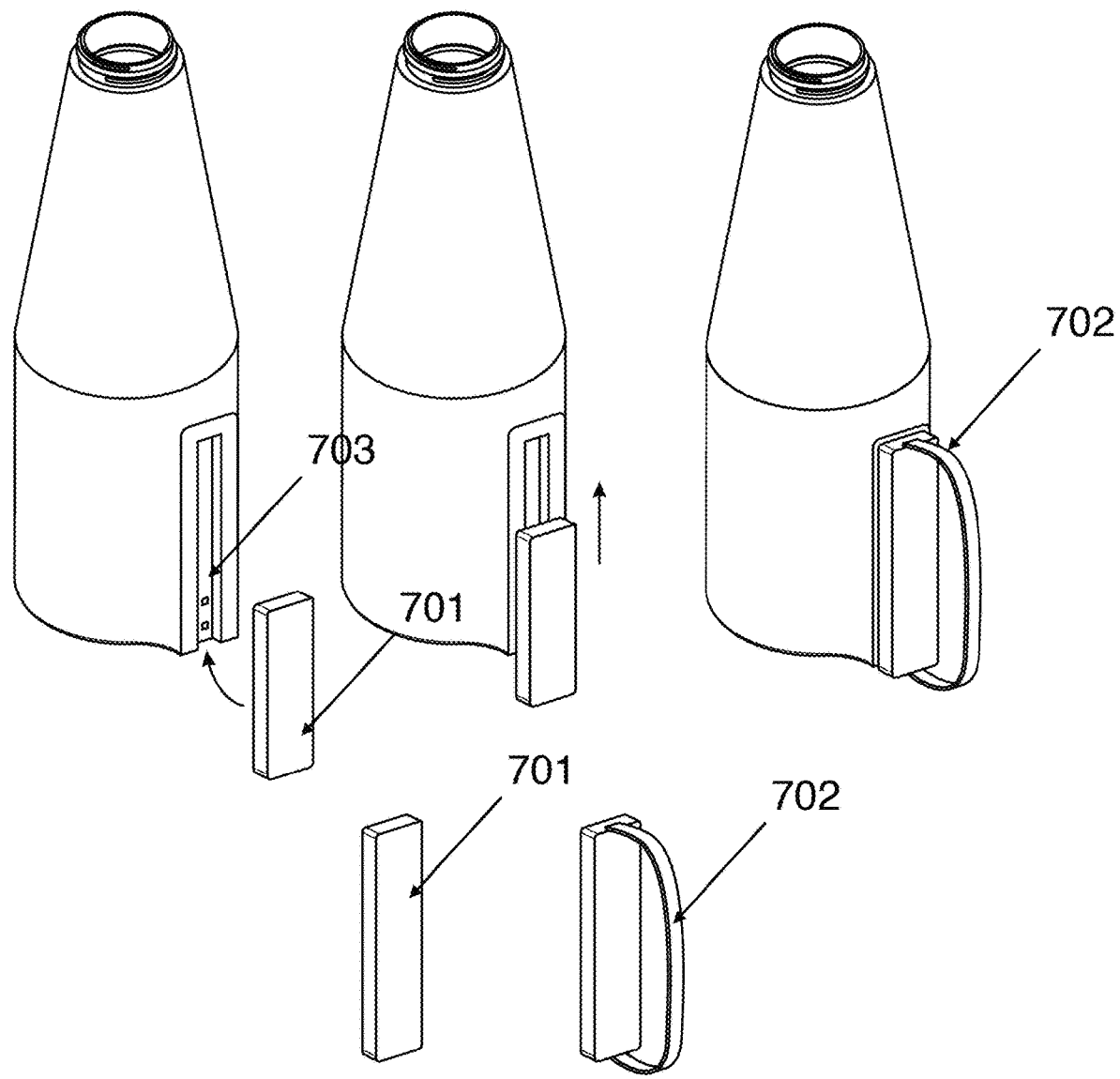
FIG. 21 is illustration of a detachable component on video game apparatus.

In further embodiments as illustrated in FIG. 21, container 110 may have a receptacle 703 to house a detachable component 701 that may have similar internal components and act similar to controller 300 to operate interactive video game apparatus. Detachable component 701 may be fastened to a handle 702 for holding by a user 200.

Figure 22:
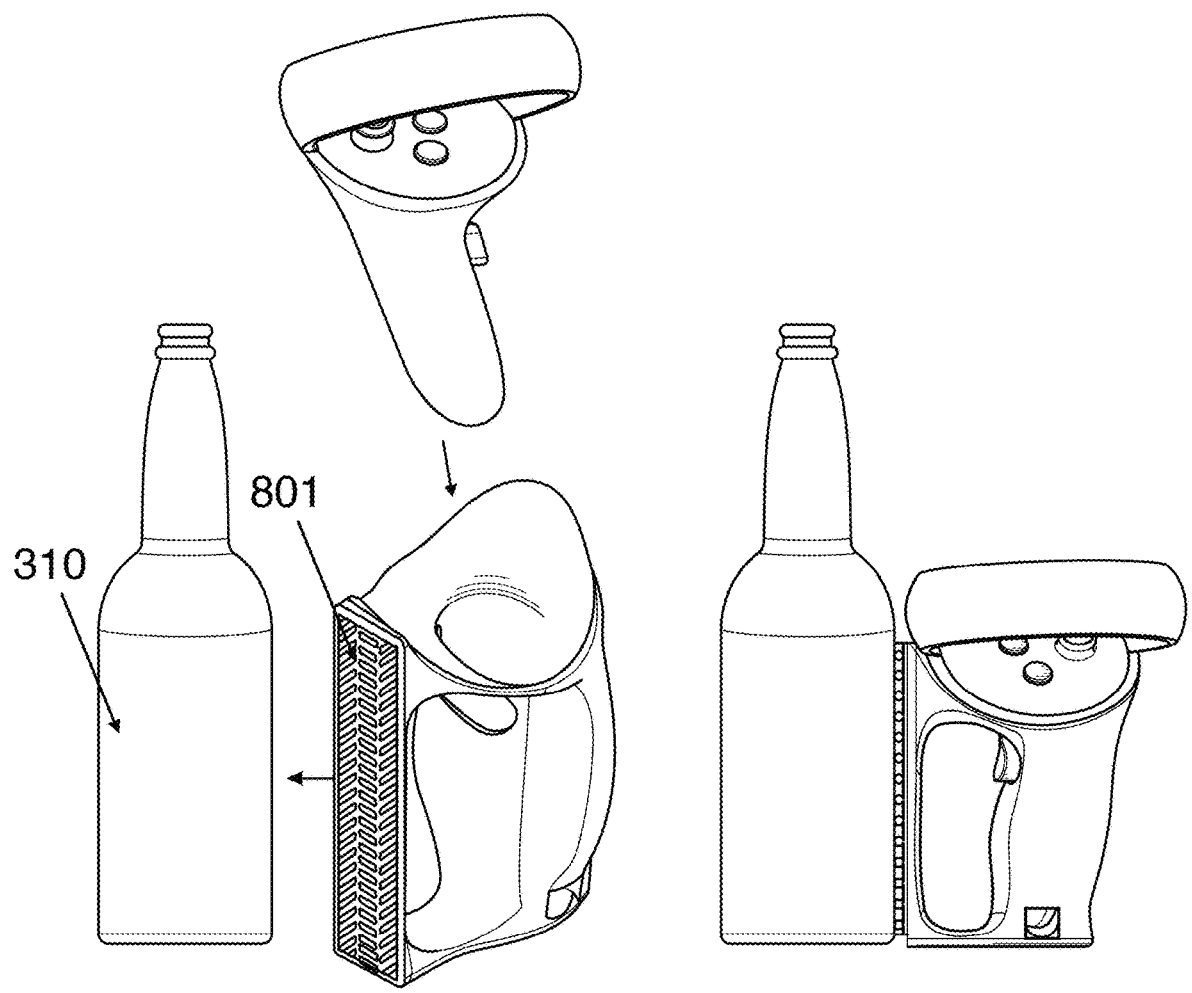
FIG. 22 is illustration of a detachable component on video game apparatus being attached to a drinking bottle.

In another embodiment as illustrated in FIG. 22, container 110 may be removed and handle 120 may be directly attached to a bottle 310 by an adhesive strip 801 that may be removably fastened to bottle 310 instead of container 110.

Figure 23:
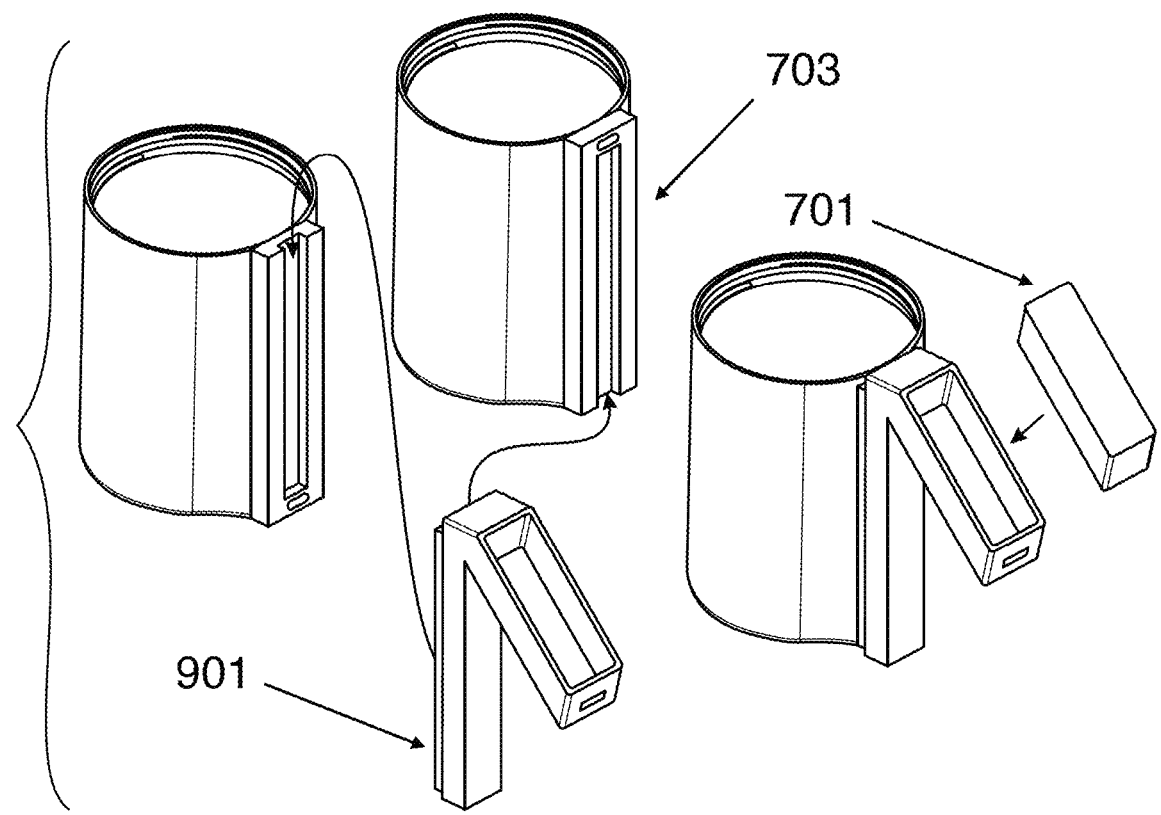
FIG. 23 is illustration of another embodiment of the video game apparatus with another detachable component.

In another embodiment as illustrated in FIG. 23, container 110 may have a receptacle 703 to house a detachable angled handle 901 to hold detachable component 701 which may have similar components and act similar to controller 300 to operate interactive video game apparatus.

Figure 24:
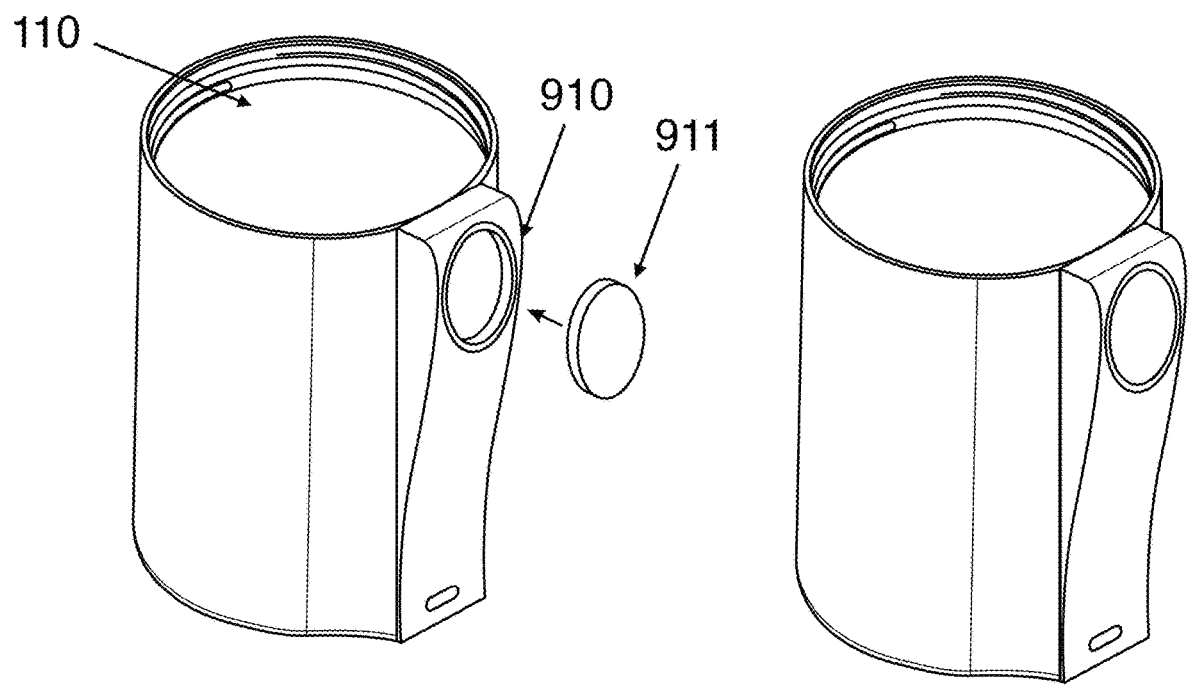
FIG. 24 is illustration of another embodiment of the video game apparatus with another detachable component.

In another embodiment as illustrated in FIG. 24, container 110 may have a receptacle 910 to hold a detachable component 911 which may have similar components and act similar to controller 300 to operate interactive video game apparatus. In further embodiments 911 may be an UltraWide Band' 'UWB Chip' where UWB calculates a location by measuring how long it takes super-short radio pulses to travel between devices.

Figure 25:
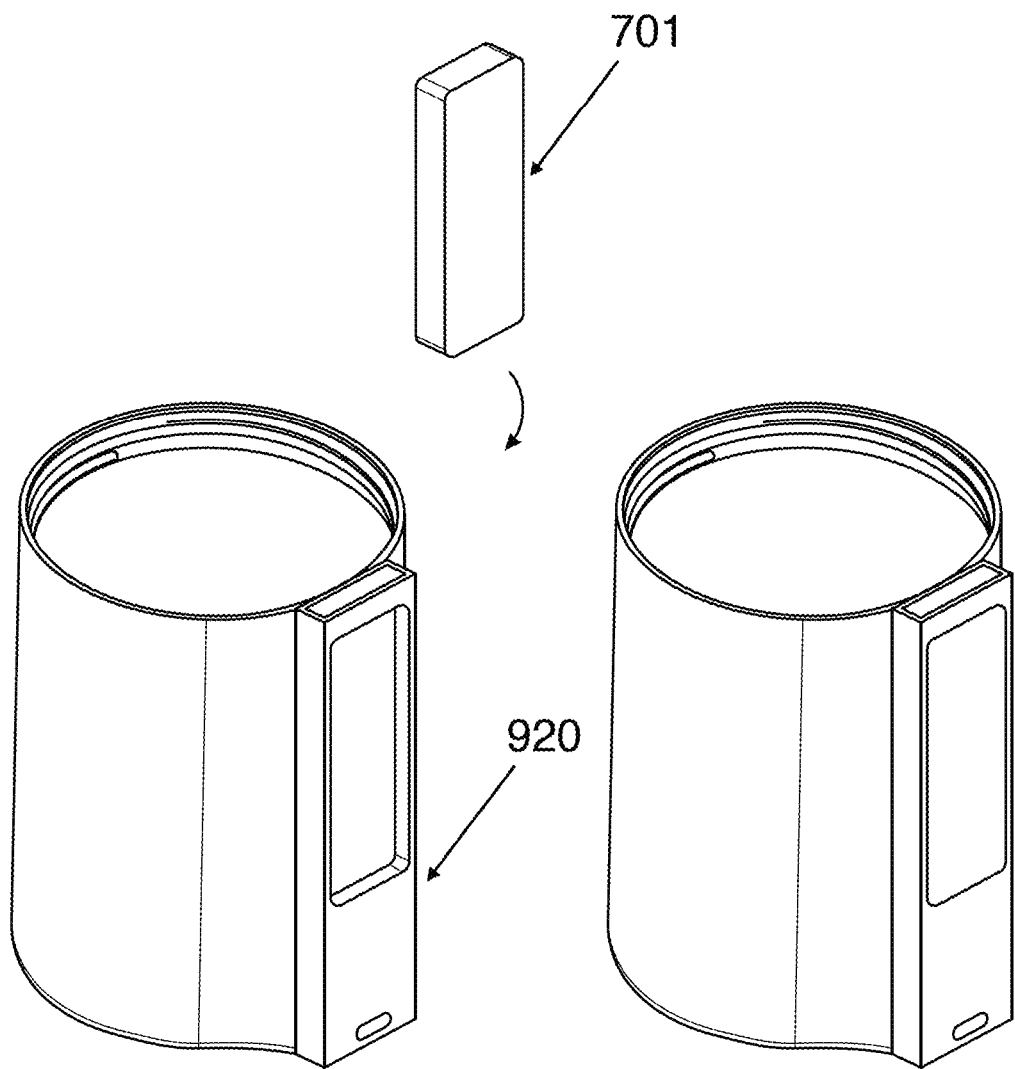
FIG. 25 is illustration of another embodiment of the video game apparatus with another detachable component.

In another embodiment as illustrated in FIG. 25, container 110 may have a receptacle 920 to hold detachable component 701 which may have similar internal components and act similar to controller 300 to operate interactive video game apparatus.

Figure 26:
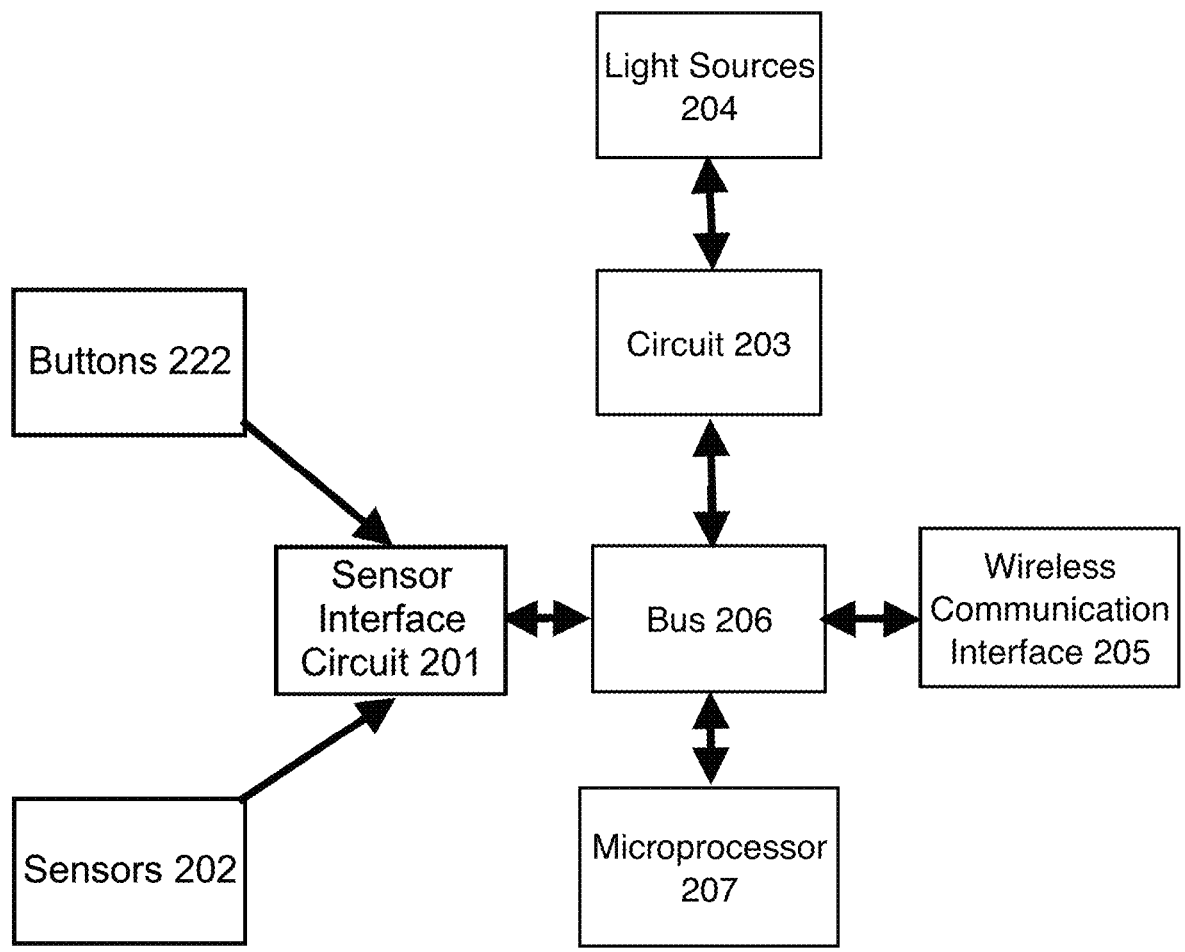
FIG. 26 is a block diagram of the components of the interactive video game apparatus.

FIG. 26, is an example schematic block diagram of a video game apparatus system including interactive video game apparatus 100 in accordance with an embodiment. Interactive video game apparatus 100 may include one or more buttons 222, sensors 202, one or more sensor interface circuits 201, light sources 204, a circuit 203, a wireless communication interface 205, a bus 206, and a microprocessor 207. The sensor interface circuit 201 may be a digital, analog, or mixed-signal circuit to receive sensor signals in the form of voltage or current from buttons 222 when they are interacted with by user 200 and sensors 202. Buttons 222 and sensors 202 may generate sensor signals responsive to being pressed by the finger or thumb of user 200. In some embodiments, the controls may be connected to a transducer that converts the mechanical motion of the controls into the sensor signals.

Interactive video game apparatus 100 may include circuit 203 to provide electrical signals, such as voltage, to light sources 204. Circuit 203 may be powered by the power system of interactive video game apparatus 100 to generate the electrical signals. Light sources 204 emit the light responsive to receiving the electrical signals received. Interactive video game apparatus 100 may include wireless communication interface 205, which may be a digital, analog, or mixed-signal circuit to transmit wireless signals indicating user input received from interactive video game apparatus 100. The wireless signals may be transmitted to a computing device such as a video game console, a computer, a wearable device, tablet, mobile computing device, head-mounted display, a computer, a virtual reality system, etc. Wireless communication interface 205 may send and receive data via a wireless network without the need for connecting cables to interactive video game apparatus 100.

Wireless communication interface 205, sensor interface circuits 201, and circuit 203 may communicate via bus 206. Bus 206 may communicate with microprocessor 207 which compares data with the instructions in the game software for specific input from buttons 222 and triggers the appropriate response. Each of the controls may be configured to activate a corresponding electronic input sensor to generate an activate control signal responsive to users 200 acting upon them. For example, each control signal associated with a control may be mapped to an interactive video game operation. Different video games may have different mappings of control signals to operations. In some cases, each action button may be mapped to a different operation. In other cases, two action buttons may be mapped to a same operation.

In one or more non-limiting embodiments, interactive video game apparatus 100 may have one or more vibration motors (e.g., rumble motors, eccentric rotating mass vibration motors) that can be selectively actuated by a signal communicated to interactive video game apparatus 100 from a separate device such as a video game console to provide vibration feedback to parts of interactive video game apparatus 100 (e.g., provide vibration feedback to handle 120).

Figure 27:
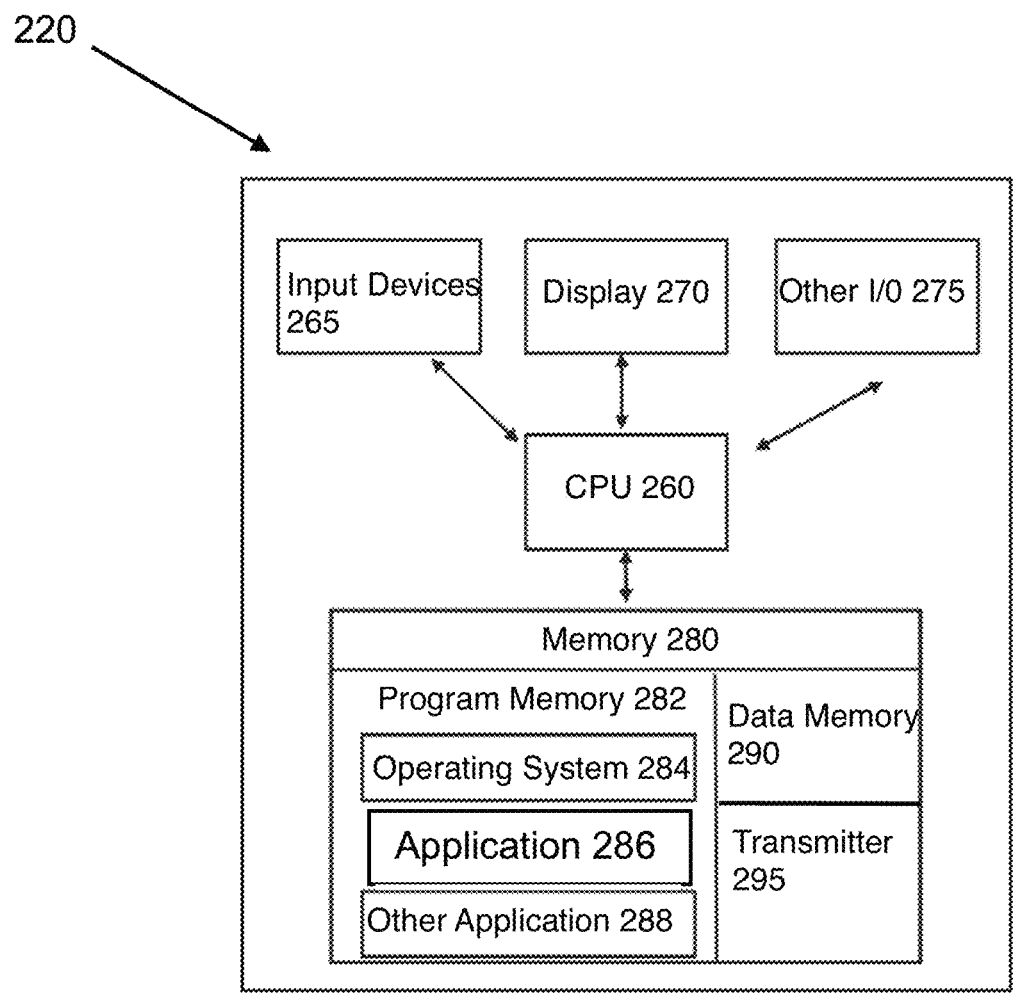
FIG. 27 is a block diagram of a computing device.

As previously described, interactive video game apparatus 100 may be connected to a computing device 220. Turning to FIG. 27, FIG. 27 is a block diagram showing various components of computing device 220. Computing device 220 may comprise a housing for containing one or more hardware components that allow access to edit and query wireless communication interface 205. Computing device 220 may include one or more input devices such as input devices 265 that provide input to a CPU (processor) such as CPU 260 of actions related to user 200. Input devices 265 may be implemented as a keyboard, a touchscreen, a mouse, via voice activation, wearable input device, a 3D camera, a trackball, a microphone, a fingerprint reader, an infrared port, a controller, a remote control, a fax machine, and combinations thereof.

The actions may be initiated by a hardware controller that interprets the signals received from input device 265 and communicates the information to CPU 260 using a communication protocol. CPU 260 may be a single processing unit or multiple processing units in a device or distributed across multiple devices. CPU 260 may be coupled to other hardware devices, such as one or more memory devices with the use of a bus, such as a PCI bus or SCSI bus. CPU 260 may communicate with a hardware controller for devices, such as for a display 270. Display 270 may be used to display text and graphics. In some examples, display 270 provides graphical and textual visual feedback to a user.

In one or more embodiments, display 270 may include an input device 265 as part of display 270, such as when input device 265 is a touchscreen or is equipped with an eye direction monitoring system. In some implementations, display 270 is separate from input device 265. Examples of display 270 include but are not limited to: an LCD display screen or an LED.

Display 270 may be binocular head mounted display (HMD), head mounted goggles (HMG), an augmented reality device, virtual reality glasses, a scope simulator, a hologram a monocular simulator, a binoculars simulator, or a telescope simulator, Google Glass™, or another form of device that is connectable to the computing device whereby user may view a virtual environment through the display.

In one or more non-limiting embodiments, display 270 may be a mobile device or other device. The camera of a mobile device may capture video of the surrounding area so that user 200 may interact with the augmented reality view by inserting annotations, comments, virtual objects, pictures, audio, and video, to locations within range of computing device. The virtual objects may include virtual characters or static virtual objects, and any other virtual objects that can be rendered by the augmented reality networking system built within the system. These interactions may be viewed by other users who may also build upon the interactions or make additional interactions that then may be seen by the original user or a third user.

Computing device 220 or a connected server may be configured to convert captured video data describing interactive video game apparatus 100 real world positions and movements into positions and movements that fit within predetermined constraints of the virtual world in which a corresponding virtual object of interactive video game apparatus 100 can be rendered. Particularly, computing device 220 may employ a set of hardware/software modules to accurately map real-world positions and movements to a virtual object rendered within a virtual environment. In some embodiments, computing device 220 may employ a set of hardware/software modules to accurately map real-world interactive video game apparatus 100 positions and movements to an augmented reality environment.

Other I/O devices such as I/O devices 275 may also be coupled to the processor, such as a network card, video card, audio card, USB, FireWire or other external device, camera, printer, speakers, CD-ROM drive, DVD drive, disk drive, or Blu-Ray device. In further non-limiting embodiments, a display 270 may be used as an output device, such as, but not limited to, a computer monitor, a speaker, a television, a smart phone, a fax machine, a printer, or combinations thereof.

CPU 260 may have access to a memory such as memory 280. Memory 280 may include one or more of various hardware devices for volatile and non-volatile storage and may include both read-only and writable memory. For example, memory 280 may comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. Memory 280 may be a non-transitory memory.

Memory 280 may include program memory such as program memory 282 capable of storing programs and software, including an operating system, such as operating system 284. Memory 280 may further include an application and application programing interface (API), such as application 286, and other computerized programs or application programs such as application programs 288. Memory 280 may also include data memory such as data memory 290 that may include database query results, configuration data, settings, user options, user preferences, or other types of data, which may be provided to program memory 282 or any element of user computing device 220.

Computing device 220 may have a transmitter 295, such as transmitter 295. Transmitter 295 may have a wired or wireless connection and may comprise a multi-band cellular transmitter to connect to the server over 2G/3G/4G/5G cellular networks. Other embodiments may also utilize Near Field Communication (NFC), Bluetooth, or another method to communicate information.

Figure 28:
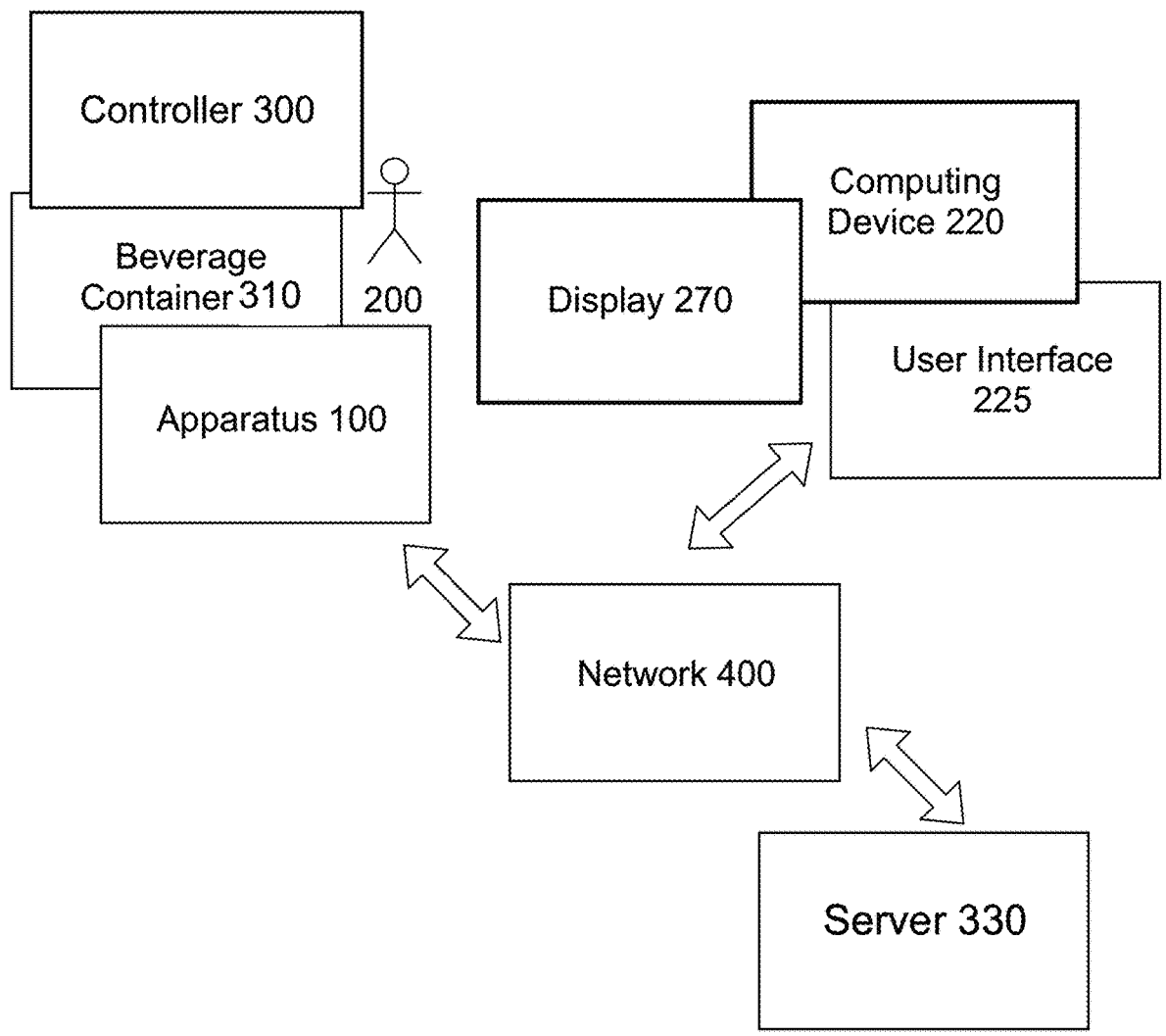
FIG. 28 is a block diagram of interactive video game apparatus system.

As illustrated in FIG. 28, user 200 may access a user interface, such as user interface 225 using computing device 220. User interface 225 may have a plurality of buttons or icons that are selectable to perform particular processes in response to the selections. User interface 225 may have conventional GUI interface devices such as a title bar, toolbars, pull-down menus, tabs, scroll bars, context help, dialog boxes, operating buttons (icons) and status bar, the user 200 navigates throughout the display.

In some embodiments, interactive video game apparatus 100 and computing device 220 may be in communication with one or more servers, such as server 330 or one or more networks such as network 400. Server 330 may be located at a data center, or any other location suitable for providing service to network 400 whereby server 330 may be in one central location or in many different locations in multiple arrangements. Server 330 may comprise a database server such as MySQL® or Maria DB® server. Server 330 may have an attached data storage system storing software applications and data. Server 330 may have a number of modules that provide various functions related to interactive video game apparatus 100. Modules may be in the form of software or computer programs that interact with the operating system of server 330 whereby data collected in databases as instruction-based expressions of components and/or processes may be processed by one or more processors within server 330 or as well as in conjunction with execution of one or more other computer programs. Modules may be configured to receive commands or requests from interactive video game apparatus 100, computing device 220, server 330, and outside connected devices over network 400. Server 330 may comprise components, subsystems, and modules to support one or more management services for interactive video game apparatus 100.

In one or more non-limiting embodiments, network 400 may include a local area network (LAN), such as a company Intranet, a metropolitan area network (MAN), or a wide area network (WAN), such as the Internet or World Wide Web. Network 400 may be a private network or a public network, or a combination thereof. Network 400 may be any type of network known in the art, including telecommunications network, a wireless network (including Wi-Fi), and a wireline network. Network 400 may include mobile telephone networks utilizing any protocol or protocols used to communicate among mobile digital user computing devices (e.g. user computing device 104), such as GSM, GPRS, UMTS, AMPS, TDMA, or CDMA. In one or more non-limiting embodiments, different types of data may be transmitted via network 400 via different protocols. In alternative embodiments, user computing devices 220, may act as standalone devices or whereby they may operate as peer machines in a peer-to-peer (or distributed) network environment.

Network 400 may further include a system of terminals, gateways, and routers. Network 400 may employ one or more cellular access technologies including 2nd (2G), 3rd (3G), 4th (4G), 5th (5G), LTE, Global System for Mobil communication (GSM), General Packet Radio Services (GPRS), Enhanced Data GSM Environment (EDGE), and other access technologies that may provide for broader coverage between user computing devices if for instance they are in a remote location not accessible by other networks.

Computing device 220 or server 330 may have one or more modules operable to perform and implement various types of function, actions, and operations for having a processor which may execute an application or program and generate its own modified video signal based on the information received from sensors 202 of interactive video game apparatus 100. The application may be a simulation, a video game or a social application. The application may be downloaded from the Internet using a wired or wireless connection. The application may be part of an online marketplace for applications for personal viewing devices. In some embodiments, the application may be hard-coded into the processor.

Computing device 220 or server 330 may natively have Optical Character Recognition (OCR) technology or integrated technology from existing third party systems, that may detect and recognize one or more type of objects in received real-time images and videos and replace & retarget those objects with other 3D objects (housed on server 300, third party server systems, on computing device 220, or distributed on other users' computing devices 220 via a blockchain). In some embodiments, OCR is a task in computer vision that involves identifying the presence, location, and type of one or more objects in given content.

Computing device 220 or server 330 may integrate Artificial Intelligence and Machine Learning known by those of ordinary skill in the art. Computing device 220 or server 330 may perform detection processes for different types of content, including, audio, video, text, or other identifying objects collected from the video or images. After receiving video or image, computing device 220 or server 330 may analyze whether the content is a Photo, Video, Audio, or Text element based on file type (codec)/file size.

User 200 may initially register to become a registered user of application 286. When user 200 initially registers to become a registered user of application 286, user 200 may be prompted to provide some personal information along with a requested account name and password, such as, without limitation, their name, age (e.g., birth date), gender, interests, contact information, home town, address, their visual capabilities such as only being able to see out of the left or right eye as well as other preferences. User preferences may also aid user 200 choosing defaults for common settings such as vocal levels, effects, settings when sharing, audio, and video recordings.

In some embodiments, when registering a user account, application 286 may allow user 200 to access and interact with application 286 using login credentials from other social networking platforms. For example, in some embodiments, it may be useful and convenient for users of application 286 to be able to log in using credentials or sign in information from another social media application, such as Facebook®, Apple®, Snap®, or the like. This is advantageous for users who do not wish to have to learn or provide multiple types of login information.

User 200 may be requested to take pictures of themselves whereby server 330 collects and stores pictures of each user in a database to display to other users 200, for example, through a user interface 225 of computing device 220. Pictures may be for identification purposes during navigation of a session and to enhance the authenticity of the process by ensuring that the picture is of the correct, intended user when interacting with other users 200. User 200 may couple, link, or connect with user accounts from social networking websites and internal networks. Examples of social networking websites include but are not limited to Instagram®, Facebook®, LinkedIn®, Snapchat®, and Twitter®. Server 330 may use access tokens or other methods as a parameter for searching for a friend list or address book of users on a social networking site or other site. Server 330 then may use this friend list information to initialize a contact list database for users stored within server databases.

After registering, user 200 may invite other users, or be invited by other users, to connect via application 286. The connection may be mutual where both users consent the connection. In some embodiments, the connection may be one sided where one user "follows" the other user, which does not require the other user's consent. When one user has a connection with another user, the connected users may be able to communicate with the other user as well as receive user's 200 invites. In some embodiments, application 286 may automatically connect two users based on user specifications and criteria. Settings regarding communications by user 200 may be modified to enable user 200 to prevent the system from automatically connecting user 200 to another user or letting another user follow the user 200, or letting another user message the user 200, as well as other settings.

In some embodiments, user 200 may invite other users to have a connection or join a specific virtual environment via a "bump" mechanism between interactive video game apparatuses 100 so as to connect users to be friends or in some embodiments initiate virtual avatars to appear in the same setting or another effect in the application. The bump may be replaced by other events, such as but not limited to a simultaneous gesture or button press. A valid bump is intended by both users and connects the correct users. Bumping may be validated to confirm valid bumps as well as preventing bumps between parties when one or both parties do not intend to bump. Validation may occur by server 330 receiving a signal from interactive video game apparatuses 100 has detected a change in acceleration or an impact by sensor signal processing. If the status report is indicated in the positive from both interactive video game apparatuses 100 then the location and time of both interactive video game apparatuses 100 may be compared for determining whether or not the two interactive video game apparatuses 100 were at the same place at the same time. If the interactive video game apparatuses 100 are within a predetermined distance of one another at the same time and interactive video game apparatuses 100 have detected a change in acceleration or an impact by sensor signal processing, then server 330 determines a positive correlation and connects a first and second user.

Server 330 may coordinate an interactive virtual location allowing other users 200 to participate and interact. In some embodiments, user interface 225 may present through user interface 225 an invitation to join one or more interactive virtual locations. Virtual locations may be searchable and/or filtered. Interactive events may be a scheduled event and the plurality of users 200 may join the scheduled event by accepting a request the event published.

Application 286 may allow users and interactive video game apparatus 100 to interact with other users' objects in a virtual environment presented through display 270 such as a bar, hotel, beach, outdoor venue, or other locations. A user 200 playing application 286 and wearing device having display 270 may recognize the location of interactive video game apparatus 100 by a computer-generated image or virtual representation of interactive video game apparatus 100, or a default beverage container so as to find interactive video game apparatus 100 or beverage container in the real world. During interaction, interactive video game apparatus 100 may be placed on a physical table located in a room or moved to the user's 200 mouth where the virtual representation may be tracked and displayed in real time corresponding to the real world apparatus. Computing device 220 or server 330 may also determine by sensors 202 that interactive video game apparatus 100 has been placed down and place a representation of the table into the virtual environment through display 270.

In application 286, one or more of the users 200 may be represented on screen by a virtual avatar, as illustrated in FIG. 29. In some embodiments, an avatar may be a computer-generated image. In other embodiments, an avatar may be a digital image, such as a video capture of a person. An avatar may be modeled on a famous figure or, in some embodiments, the avatar may be modeled on users 200 associated with the avatar. In cases where additional users enter the game, the screen may be altered to display any other additional avatars.

In one or more embodiments, application 286 may include a "beverage directory". The beverage directory may be stored on a computing device 220 or server 330 database having types and brands of beverages, along with the shape and information gleaned from various other sources that computing device 220 and server 330 may utilize for a more precise virtual representation of the contents of beverage container 310 in the virtual environment through display 270. Beverage directory may be presented in front of user or on video game apparatus 100 whereby user may select the desired drink they want to appear to be holding. In some embodiments the actual beverage may be an access point to a specific exclusive virtual world that may only be unlocked by drinking the beverage. In further embodiments virtual beverages may be free or purchased from a marketplace whereby they may be an NFT with an exclusive blockchain signifier.

Input devices 265 such as a camera may recognize the beverage bottle positioned in container 110 to be a specific type of bottle such as by identifying and scanning a visual symbol, marker, or code on the bottle such as a UPC symbol, or based on the shape of the bottle or object and searching a database of products and placing a representation of it into the virtual environment through display 270. Input devices 265 may recognize user 200 walking over to interactive video game apparatus 100 and grasp it with their physical hand and physically drink the real contents inside beverage container 310 in container 110. As this is happening, the display 270 may show representations of the user's hand and bottle with its contents being emptied. Utilizing sensors 202 or input devices 265, computing device 220 or server 330 may recognize that user 200 is drinking the contents of beverage container 310 and update representation of the contents of beverage container 310 into the virtual environment through display 270. In some embodiments, user 200 may push button 222 when the top opening of beverage container 310 is at their mouth whereby computing device 220 or server 330 may determine the corresponding representation of beverage container 310 based on the length determined.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. An apparatus for interacting with an interactive application, comprising:
    a housing having a container, the container holding a liquid or liquid container, a controller securing component for securing a controller, and one or more sensors for three dimensional orientation & reconstruction of a virtual representation of the apparatus, wherein the one or more sensors are one or more digital scales capable for determining an amount of liquid in the container or the liquid container.

2. The apparatus of claim 1, wherein the housing has one or more controls.

3. The apparatus of claim 2, further comprising one or more processors coupled to one or more databases and at least one computing device coupled to the one or more processors and the one or more databases, wherein the at least one computing device performs steps of:
    generating a virtual environment.

4. The apparatus of claim 3, wherein the at least one computing device performs further steps of:
    determining a length of the liquid container in the container from an input of the one or more controls; and
    generating a representation of the liquid container in the virtual environment.

5. The apparatus of claim 3, wherein the at least one computing device performs further steps of:
    storing a liquid container catalogue on the one or more databases.

6. The apparatus of claim 5, wherein the at least one computing device performs further steps of:
    receiving content of the liquid container from one or more input devices; and
    recognizing the liquid container using Optical Character Recognition technology and comparison from searching the liquid container catalogue.

7. The apparatus of claim 6, wherein the at least one computing device performs further steps of:
    recognizing a UPC symbol on the liquid container to determine the liquid container.

8. The apparatus of claim 7, wherein the at least one computing device performs further steps of:
    connecting a user and a second user into the virtual environment by a bump between the apparatus and a second apparatus wherein a location and time of the apparatus and the second apparatus is determined.

9. The apparatus of claim 3, wherein the at least one computing device performs further steps of:
    determining from the one or more sensors that the apparatus has been placed down on a table; and
    generating a representation of the liquid container in the container in the virtual environment.

10. An apparatus for interacting with an interactive application, comprising:
    a housing having a container, the container holding a liquid or liquid container, a controller securing component extending from or integrated into the container;
    one or more sensors for three dimensional orientation & reconstruction of a virtual representation of the apparatus; and
    one or more processors coupled to one or more databases and at least one computing device coupled to the one or more processors and the one or more databases, wherein the at least one computing device performs steps of:

generating one or more virtual environments that are selectable by a user to interact with one or more second users; and connecting the user and the one or more second users into the one or more virtual environments by a simultaneous gesture in proximity to each other between the apparatus and a second apparatus wherein a location and time of the apparatus and the second apparatus is determined.

11. An apparatus for interacting with an interactive application, comprising: a housing having a container, the container holding a liquid or liquid container, a controller-securing component for securing a controller or sensor module with one or more sensors for three dimensional orientation & reconstruction and a virtual representation of the apparatus, wherein the apparatus has at least one computing device, wherein the at least one computing device performs steps of:

receiving information of a liquid container;

storing a liquid container catalogue on one or more databases;

identifying the liquid container using the liquid container catalogue; and recognizing the liquid container by object character recognition.

12. The apparatus of claim 11, further comprising a spout cover removably connected to the container, wherein the spout cover has an opening to access the liquid.

13. The apparatus of claim 11, wherein the apparatus has a detachable component that is configured to calculate a location of the apparatus by measuring how long it takes radio pulses to travel.

14. The apparatus of claim 11, wherein the apparatus is connected to a liquid container by a removably fastenable strip.

15. The apparatus of claim 11, wherein the apparatus has light source that lights up or flash colors when certain events occur and a speaker assembly for producing sounds.

16. An apparatus for interacting with an interactive application, comprising: a housing having a container, the container holding a liquid or liquid container, a controller-securing component for securing a controller or sensor module with one or more sensors for three dimensional orientation & reconstruction and a virtual representation of the apparatus, wherein the apparatus has at least one computing device, wherein the at least one computing device performs steps of:

receiving information of a liquid container;

storing a liquid container catalogue on one or more databases;

identifying the liquid container using the liquid container catalogue; and recognizing a UPC symbol on the liquid container to determine the liquid container.

\* \* \* \* \*